(12) United States Patent
Sim et al.

(10) Patent No.: US 11,485,123 B2
(45) Date of Patent: Nov. 1, 2022

(54) LAMINATION APPARATUS

(71) Applicant: Samsung Display Co., Ltd., Yongin-si (KR)

(72) Inventors: Jaeyoung Sim, Suwon-si (KR); Sohyun Kim, Cheonan-si (KR); Niel Han, Bucheon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/364,177

(22) Filed: Jun. 30, 2021

(65) Prior Publication Data
US 2022/0009214 A1    Jan. 13, 2022

(30) Foreign Application Priority Data

Jul. 7, 2020  (KR) .................. 10-2020-0083731
Nov. 26, 2020  (KR) .................. 10-2020-0161695

(51) Int. Cl.
*B29C 65/00*    (2006.01)
*B32B 37/00*    (2006.01)
(Continued)

(52) U.S. Cl.
CPC .......... *B32B 37/0046* (2013.01); *B32B 37/06* (2013.01); *B32B 37/10* (2013.01); *B29C 65/00* (2013.01); *B29C 65/18* (2013.01); *B29C 66/43* (2013.01); *B32B 37/0076* (2013.01); *B32B 2457/20* (2013.01)

(58) Field of Classification Search
CPC ......... B29C 65/00; B29C 65/18; B29C 66/43; B29C 66/46; B32B 37/0046; B32B 37/0076
See application file for complete search history.

(56) References Cited

U.S. PATENT DOCUMENTS 4,971,653 A * 11/1990 Powell .............. H01L 21/67069
156/345.52
6,328,807 B1 * 12/2001 Boek ...................... C23C 16/46
118/724
(Continued)

FOREIGN PATENT DOCUMENTS

KR          10-1701247         2/2017
KR     10-2017-0023267         3/2017
(Continued)

*Primary Examiner* — Philip C Tucker
*Assistant Examiner* — Nickolas R Harm
(74) *Attorney, Agent, or Firm* — Lewis Roca Rothgerber Christie LLP

(57) ABSTRACT

A lamination apparatus includes: a window jig to support a window, and a heating member in the window jig to partially heat the window jig. The window jig includes a flat portion including a first sidewall area, a second sidewall area facing the first sidewall area in a first direction, a third sidewall area perpendicular to the first sidewall area, and a fourth sidewall area perpendicular to the first sidewall area and facing the third sidewall area in a second direction perpendicular to the first direction, a first protrusion portion protruding in a third direction perpendicular to the first and second directions on the first sidewall area, and a second protrusion portion protruding in the third direction on the second sidewall area.

26 Claims, 27 Drawing Sheets

(51) Int. Cl.
 *B32B 37/10* (2006.01)
 *B32B 37/06* (2006.01)
 *B29C 65/18* (2006.01)

(56) References Cited

U.S. PATENT DOCUMENTS

| | | | | |
|---|---|---|---|---|
| 6,399,918 | B1* | 6/2002 | Komine | B29C 65/18 100/301 |
| 7,147,027 | B2* | 12/2006 | Kano | B32B 37/10 156/583.1 |
| 2007/0105459 | A1* | 5/2007 | Aruga | H01L 21/4835 257/E23.011 |
| 2009/0056866 | A1* | 3/2009 | Hwang | B32B 37/0046 156/499 |
| 2010/0103138 | A1* | 4/2010 | Huang | H05K 3/0058 29/829 |
| 2013/0081756 | A1* | 4/2013 | Franklin | B29C 53/04 264/479 |
| 2014/0002973 | A1* | 1/2014 | Lee | G06F 1/1652 361/679.01 |
| 2014/0096892 | A1* | 4/2014 | Cho | B32B 37/14 156/99 |
| 2014/0140037 | A1* | 5/2014 | Cho | F21V 9/14 156/212 |
| 2014/0377508 | A1* | 12/2014 | Oh | B32B 3/04 156/60 |
| 2016/0236458 | A1* | 8/2016 | Kim | B32B 37/1292 |
| 2018/0257357 | A1* | 9/2018 | De Leonibus | B32B 37/0046 |
| 2019/0071343 | A1* | 3/2019 | Kanasugi | C03B 23/0307 |
| 2019/0393185 | A1* | 12/2019 | Tanabe | H01L 21/68 |
| 2020/0009803 | A1* | 1/2020 | Kang | B29C 65/70 |

FOREIGN PATENT DOCUMENTS

| | | |
|---|---|---|
| KR | 10-2017-0106552 | 9/2017 |
| KR | 10-2018-0025429 | 3/2018 |
| KR | 10-2019-0056865 | 5/2019 |
| KR | 10-2020-0010710 | 1/2020 |

\* cited by examiner

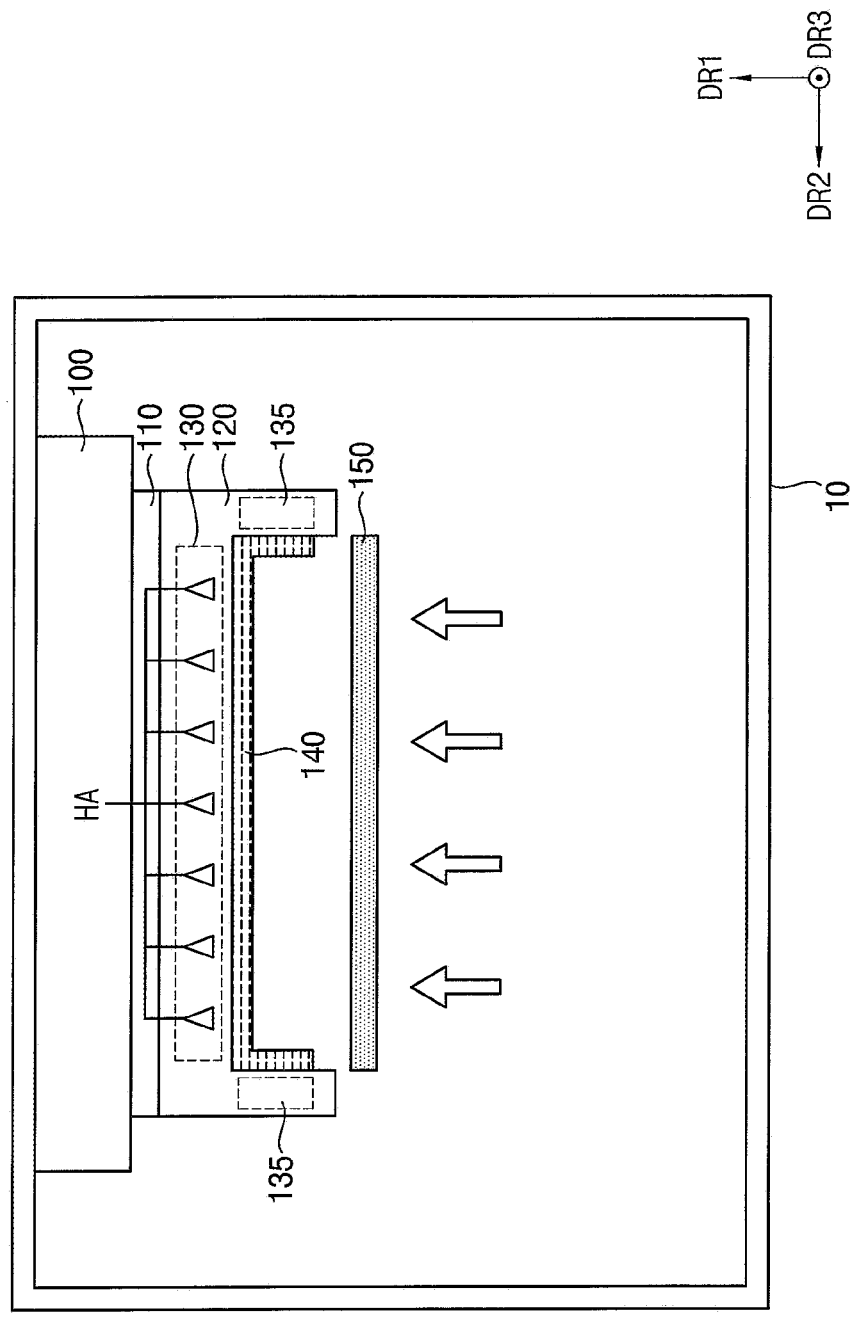

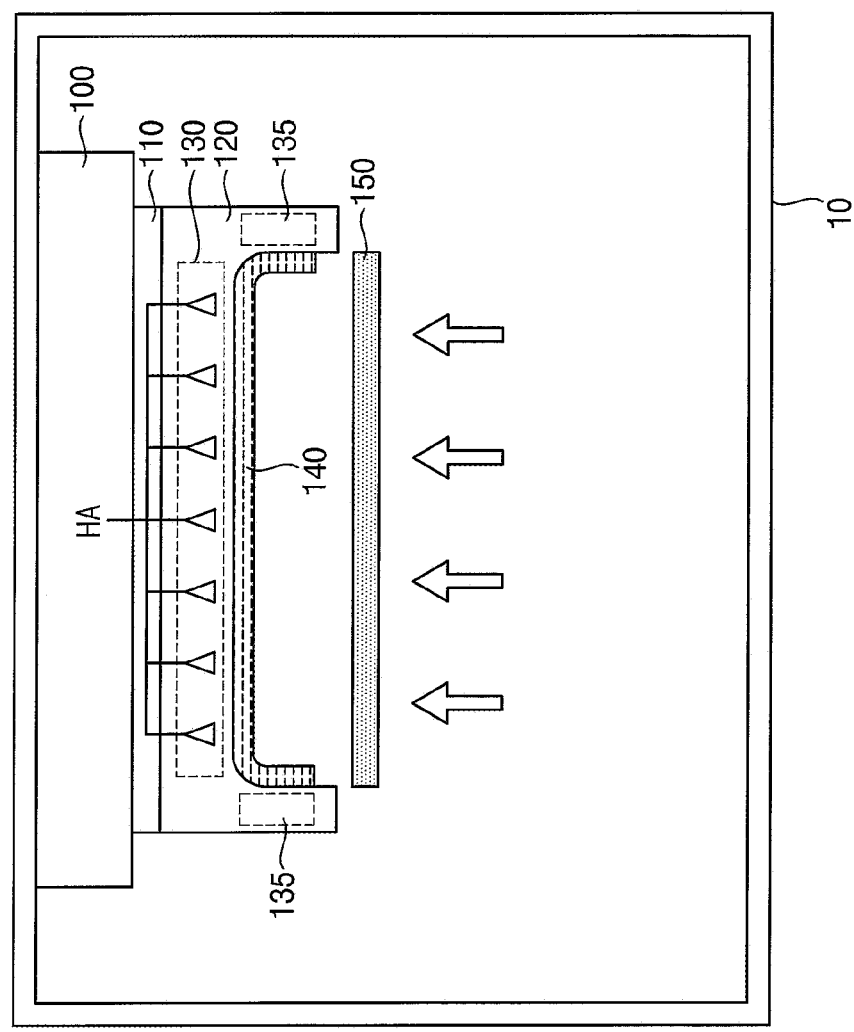

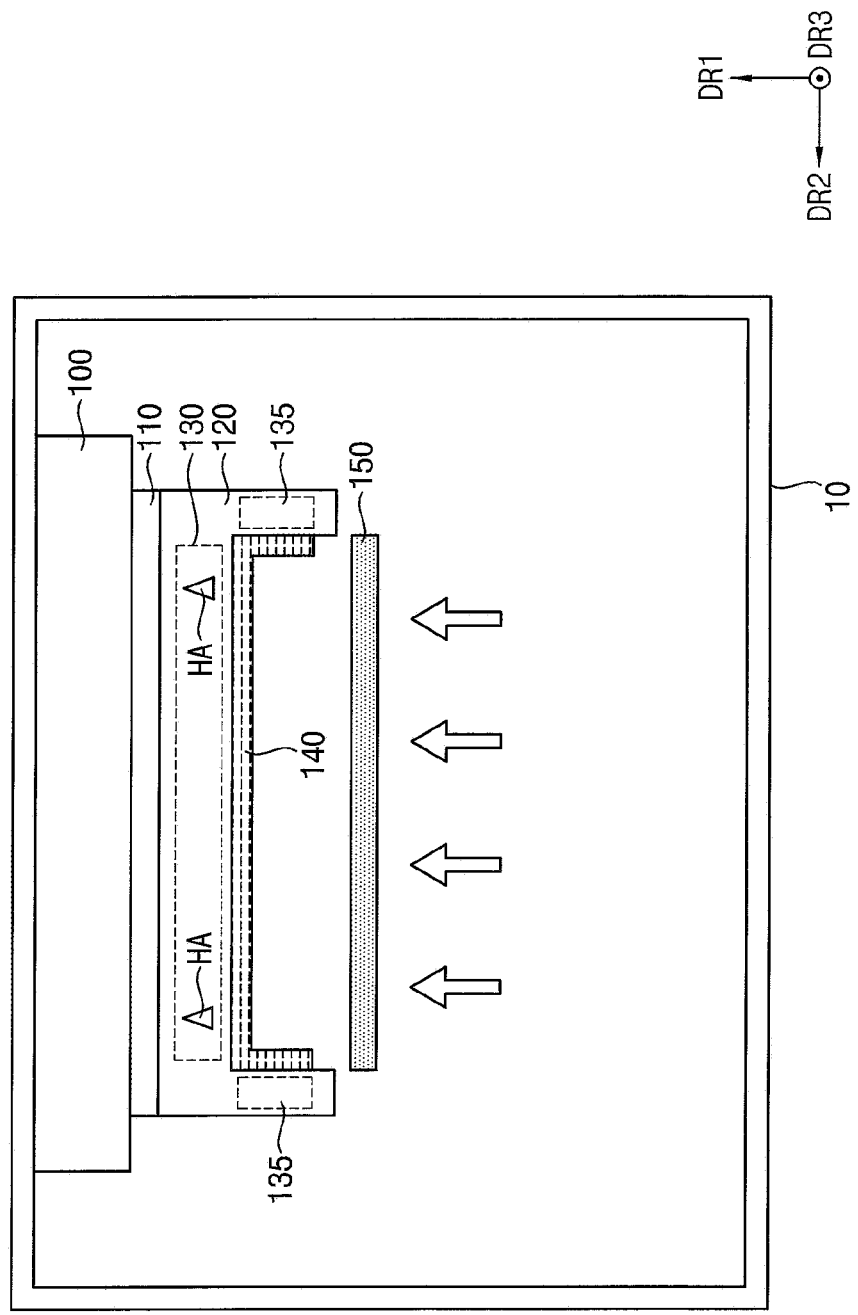

FIG. 12
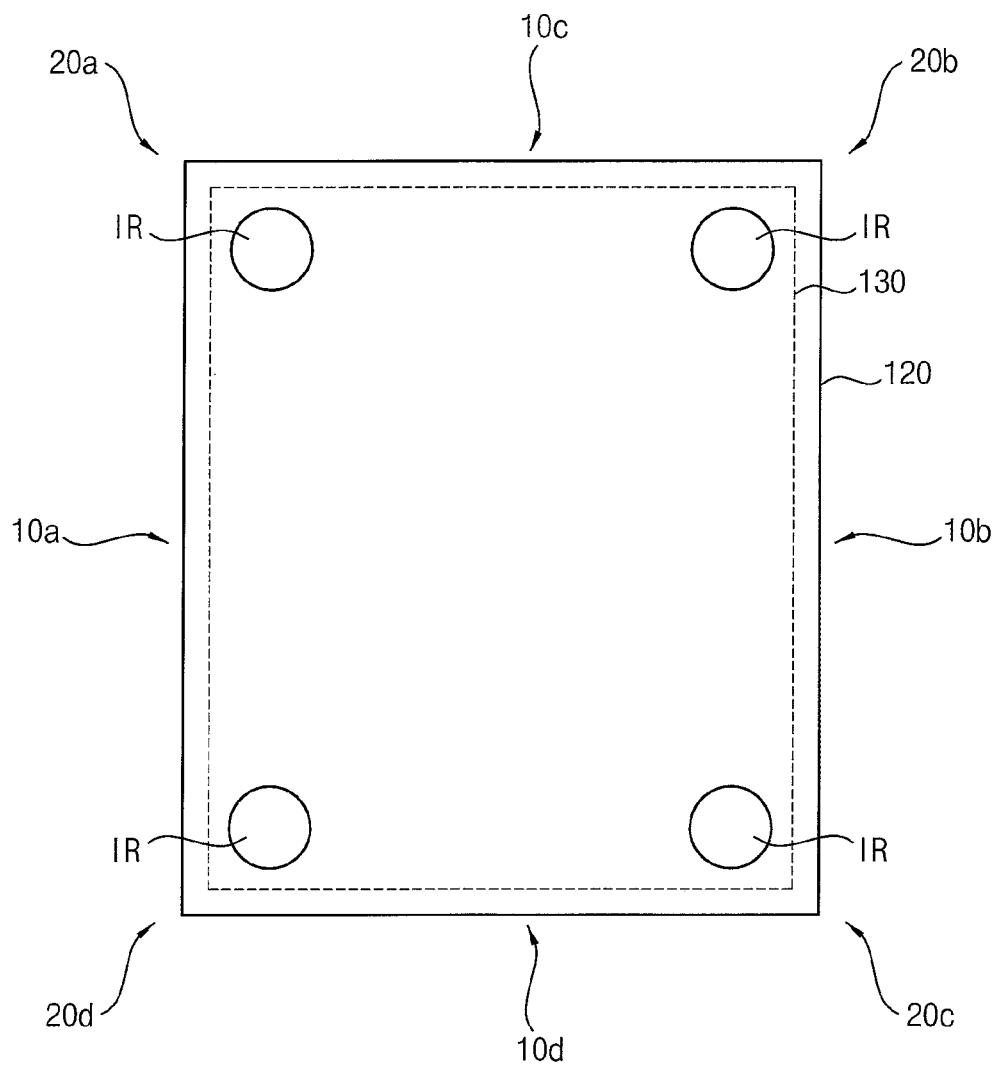
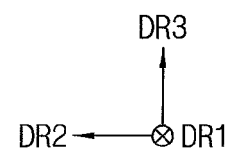

FIG. 19F
(i)
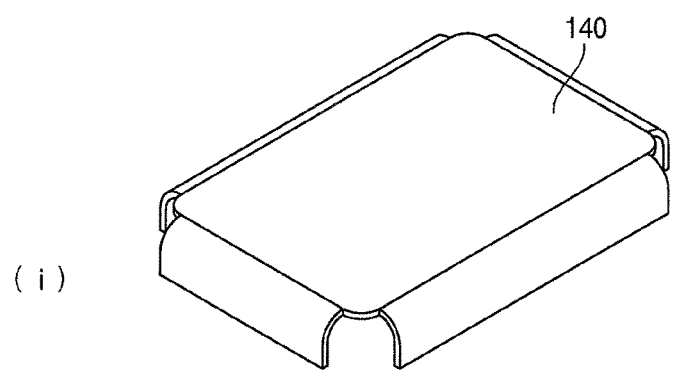
(ii)
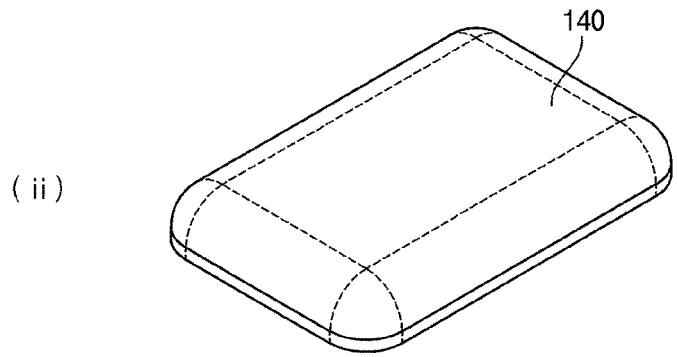

LAMINATION APPARATUS

CROSS-REFERENCE TO RELATED APPLICATIONS

This application claims priority to and the benefit of Korean Patent Application No. 10-2020-0083731, filed on Jul. 7, 2020, and Korean Patent Application No. 10-2020-0161695, filed on Nov. 26, 2020, in the Korean Intellectual Property Office, the entire disclosure of each of which is hereby incorporated by reference.

BACKGROUND

1. Field

Aspects of embodiments of the present invention relate to a lamination apparatus.

2. Discussion of the Background

Recently, as interest in display devices increases, various studies on the display device have been conducted. Accordingly, the display device has been manufactured in various types including organic light emitting diodes (OLED) and liquid crystal displays (LCD).

The display device may provide various images to a user through a display panel. The display device may include a window for protecting the display panel. The window may be coupled to the display panel while covering the display panel. Accordingly, the window may protect the display panel on the display panel.

However, air bubbles may be generated between the display panel and the window during coupling the display panel to the window. Accordingly, the air bubbles may be visually recognized from the outside. Also, an adhesive force between the display panel and the window may be decreased due to the air bubbles.

Accordingly, studies have been conducted to reduce the air bubbles generated during coupling the display panel to the window.

SUMMARY

According to an aspect of embodiments of the present invention, a lamination apparatus may reduce air bubbles generated during coupling a display panel to a window. According to another aspect of embodiments of the present invention, a lamination apparatus including a heating member is provided.

A lamination apparatus according to one or more embodiments may include a window jig to support a window and a heating member in the window jig to partially heat the window jig, wherein the window jig may include a flat portion including a first sidewall area, a second sidewall area facing the first sidewall area in a first direction, a third sidewall area perpendicular to the first sidewall area, and a fourth sidewall area perpendicular to the first sidewall area and facing the third sidewall area in a second direction perpendicular to the first direction, a first protrusion portion protruding in a third direction perpendicular to the first and second directions on the first sidewall area, and a second protrusion portion protruding in the third direction on the second sidewall area.

According to one or more embodiments, the heating member may include a cartridge heater including an electrical resistance member.

According to one or more embodiments, the cartridge heater may be arranged in the flat portion.

According to one or more embodiments, the electrical resistance member may overlap each of the first sidewall area and the second sidewall area.

According to one or more embodiments, the electrical resistance member may overlap each of the first sidewall area, the second sidewall area, the third sidewall area, and the fourth sidewall area.

According to one or more embodiments, the electrical resistance member may overlap each of a first corner area adjacent to the first sidewall area and the third sidewall area, a second corner area adjacent to the second sidewall area and the third sidewall area, a third corner area adjacent to the second sidewall area and the fourth sidewall area, and a fourth corner area adjacent to the first sidewall area and the fourth sidewall area.

According to one or more embodiments, the cartridge heater may be arranged in each of the first sidewall area and the second sidewall area.

According to one or more embodiments, the cartridge heater may be arranged in each of the first sidewall area, the second sidewall area, the third sidewall area, and the fourth sidewall area.

According to one or more embodiments, the cartridge heater may be arranged in each of a first corner area adjacent to the first sidewall area and the third sidewall area, a second corner area adjacent to the second sidewall area and the third sidewall area, a third corner area adjacent to the second sidewall area and the fourth sidewall area, and a fourth corner area adjacent to the first sidewall area and the fourth sidewall area.

According to one or more embodiments, the lamination apparatus may further include: a chamber in which the window jig is located; a pressing member to press the display panel inside the chamber to bring the display panel into contact with the window; and a window jig fastening member between the chamber and the window jig, supporting the window jig, and including a pressure sensor to sense a pressure applied by the pressing member.

According to one or more embodiments, the lamination apparatus may further include a heat dissipation member between the window jig and the window jig fastening member.

A lamination apparatus according to one or more embodiments may include: a window jig to support a window, and including a flat portion including a first sidewall area, a second sidewall area facing the first sidewall area in a first direction, a third sidewall area perpendicular to the first sidewall area, and a fourth sidewall area perpendicular to the first sidewall area and facing the third sidewall area in a second direction perpendicular to the first direction, a first protrusion portion protruding in a third direction perpendicular to the first and second directions on the first sidewall area, and a second protrusion portion protruding in the third direction on the second sidewall area; and a heating member located in a first corner area adjacent to the first sidewall area and the third sidewall area of the flat portion, a second corner area adjacent to the second sidewall area and the third sidewall area, a third corner area adjacent to the second sidewall area and the fourth sidewall area, and a fourth corner area adjacent to the first sidewall area and the fourth sidewall area.

According to one or more embodiments, the heating member may be further located in a center of the flat portion.

According to one or more embodiments, the heating member may include an infrared lamp to emit light.

According to one or more embodiments, the lamination apparatus may further include: a chamber in which the window jig is located; a pressing member to press the display panel inside the chamber to bring the display panel into contact with the window; and a window jig fastening member between the chamber and the window jig, supporting the window jig, and including a pressure sensor to sense a pressure applied by the pressing member.

According to one or more embodiments, the lamination apparatus may further include a heat dissipation member between the window jig and the window jig fastening member.

A lamination apparatus according to one or more embodiments may include: a window jig fastening member including a top surface including a central area, a first sidewall area positioned in a first direction of the central area, a second sidewall area spaced apart from the first sidewall area by the central area, a third sidewall area positioned in a second direction perpendicular to the first direction of the central area, a fourth sidewall area spaced apart from the third sidewall area by the central area, a first corner area adjacent to the first sidewall area and the third sidewall area, a second corner area adjacent to the second sidewall area and the third sidewall area, a third corner area adjacent to the second sidewall area and the fourth sidewall area, and a fourth corner area adjacent to the first sidewall area and the fourth sidewall area; a first heat dissipation member arranged on the central area of the window jig fastening member, and including an empty space therein; a second heat dissipation member arranged in a periphery of the first heat dissipation member on the window jig fastening member, and including a thermal insulation material; a ceramic heater arranged on the second heat dissipation member to overlap the second heat dissipation member; and a current supply member connected to the ceramic heater to supply a current to the ceramic heater.

According to one or more embodiments, the second heat dissipation member may have a rectangular shape surrounding the first heat dissipation member, and the ceramic heater may have a rectangular shape surrounding the first heat dissipation member.

According to one or more embodiments, the ceramic heater may include a protrusion portion protruding in a third direction perpendicular to the first direction and the second direction at a portion overlapping the first sidewall area and the second sidewall area.

According to one or more embodiments, the ceramic heater may include a protrusion portion protruding in a third direction perpendicular to the first direction and the second direction at a portion overlapping the first to fourth sidewall areas.

According to one or more embodiments, the ceramic heater may include a protrusion portion protruding in a third direction perpendicular to the first direction and the second direction as a whole.

According to one or more embodiments, the second heat dissipation member may include a first sub-heat dissipation member overlapping the first sidewall area; and a second sub-heat dissipation member overlapping the second sidewall area, and the ceramic heater may include a first sub-ceramic heater overlapping the first sidewall area; and a second sub-ceramic heater overlapping the second sidewall area.

According to one or more embodiments, each of the first sub-ceramic heater and the second sub-ceramic heater may include a protrusion portion protruding in a third direction perpendicular to the first direction and the second direction.

According to one or more embodiments, the first heat dissipation member may overlap the first to fourth sidewall areas, the second heat dissipation member may include first to fourth sub-heat dissipation members overlapping the first to fourth corner areas, respectively, and the ceramic heater may include first to fourth sub-ceramic heaters overlapping the first to fourth corner areas, respectively.

According to one or more embodiments, the first heat dissipation member may include a protrusion portion protruding in a third direction perpendicular to the first and second directions at a portion overlapping the first to fourth sidewall areas.

According to one or more embodiments, the first heat dissipation member may include a protrusion portion protruding in a third direction perpendicular to the first and second directions at a portion overlapping the first and second sidewall areas.

According to an aspect of embodiments of the present invention, a lamination apparatus includes a window jig for supporting the window to be coupled to the display panel. The window jig may include a heating member partially heating the window jig (such as a cartridge heater, a ceramic heater, and an infrared lamp). Due to the heating member, when the window disposed in the window jig is coupled to the display panel the lamination apparatus can minimize or reduce the generation of air bubbles between the window and the display panel. In addition, due to the heating member, the lamination apparatus can effectively couple the window and the display panel even when a low pressure is applied.

It is to be understood that both the foregoing general description and the following detailed description include examples and are explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the inventive concepts.

FIGS. 1A, 1B, 2, and 3 are cross-sectional views showing lamination apparatuses according to embodiments of the present invention.

FIGS. 12 and 13 are plan views showing embodiments of a window jig included in the lamination apparatus of FIG. 11.

FIG. 19F is a perspective view showing embodiments of a window bonded by a lamination apparatus according to one or more embodiments of the present invention.

DETAILED DESCRIPTION

Figure 3:
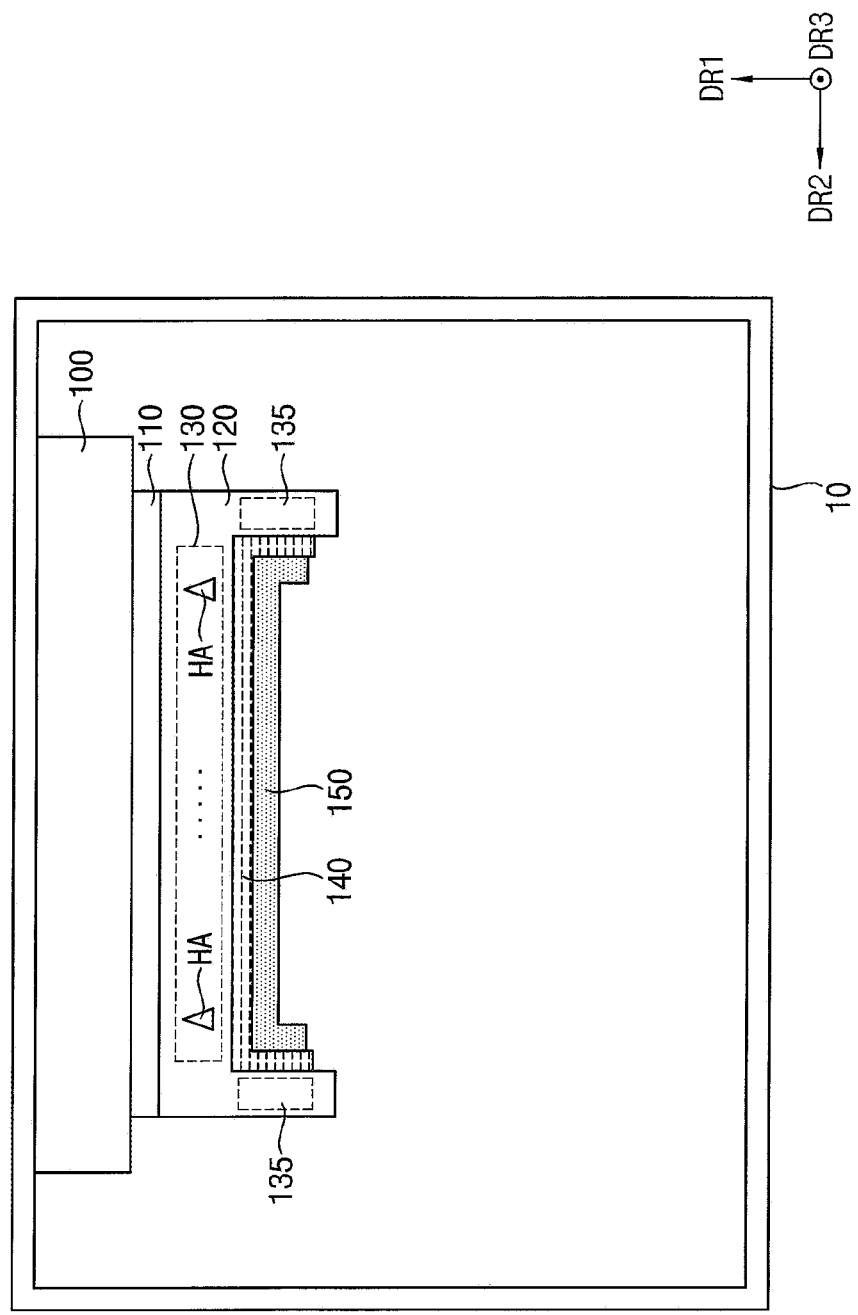

Herein, some embodiments of the present invention will be described in further detail with reference to the accompanying drawings. The inventive concepts may, however, be embodied in many different forms, and should not be construed as limited to the embodiments set forth herein. The same reference numerals are used for the same components in the drawings, and redundant descriptions of the same components may be omitted. In the drawings, the thickness, ratio, and dimensions of components may be exaggerated for ease of description of the technical content.

In the present disclosure, it is to be understood that when an element or layer is referred to as being "on," "connected to," or "coupled to" another element or layer, it may be directly on, connected, or coupled to the other element or layer, or one or more intervening elements or layers may be present.

It is to be understood that, although the terms "first," "second," etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a "second" element, component, region, layer, or section without departing from the teachings of the present disclosure. As used herein, the singular forms, "a," "an," and "the" are intended to include the plural forms as well, unless the context clearly indicates otherwise.

Spatially relative terms, such as "beneath," "below," "lower," "above," "upper," and the like, may be used herein for ease of description to describe one element or feature's relationship to another element(s) or feature(s) as illustrated in the figures.

Unless otherwise defined, all terms (including technical and scientific terms) used herein have the same meaning as commonly understood by one of ordinary skill in the art to which this disclosure belongs. It is to be further understood that terms, such as those defined in commonly used dictionaries, should be interpreted as having a meaning that is consistent with their meaning in the context of the relevant art and are not to be interpreted in an idealized or overly formal sense unless expressly so defined herein.

FIGS. 1A, 1B, 2, and 3 are cross-sectional views showing lamination apparatuses according to embodiments of the present invention.

Referring to FIGS. 1A, 1B, 2, and 3, a lamination apparatus may include a chamber 10, a window jig fastening member 100, a heat dissipation member 110, and a window jig 120.

The chamber 10 may provide a space in which a lamination process is performed. The inside of the chamber 10 may be kept in a vacuum state. In order to keep the inside of the chamber 10 in a vacuum state, the lamination apparatus may include a vent hole. The vent hole may be connected to one side of the chamber 10. Accordingly, the lamination apparatus may prevent or substantially prevent a quality of a display device from deteriorating due to outside air during the lamination process.

In the embodiments, a window 140 may be disposed inside the chamber 10. A display panel 150 may be disposed inside the chamber 10. The display panel 150 may be coupled to the window 140 while receiving a pressure in a first direction DR1 by a separate device (such as a pressing pad). In addition, the display panel 150 may be coupled to the window 140 while receiving heat by a separate device (such as a heating member).

The window jig fastening member 100 may be disposed inside the chamber 10. The window jig fastening member 100 may support the window jig 120. Although FIGS. 1A to 3 show that the window jig fastening member 100 is disposed on an upper wall of the chamber 10, a position for disposing the window jig fastening member 100 is not limited thereto. For example, the window jig fastening member 100 may be disposed on a side wall or a lower wall of the chamber 10.

The window jig fastening member 100 may include various sensors. The window jig fastening member 100 may monitor the progress of the lamination process through the sensors. In one or more embodiments, the window jig fastening member 100 may monitor information of a pressure applied while the window 140 is coupled to the display panel 150 through a pressure sensor. In addition, the window jig fastening member 100 may further include additional sensors for monitoring the progress of the lamination process in which the window 140 and the display panel 150 are coupled to each other.

In the embodiments, the heat dissipation member 110 may be disposed between the window jig fastening member 100 and the window jig 120. In an embodiment, the heat dissipation member 110 may include a thermal insulation material. The sensors may be sensitive to heat. When heat exceeding the allowable range is applied to the sensors, the sensors may fail to normally monitor the progress of the lamination process.

In one or more embodiments, the lamination apparatus may include a heating member. The heating member may apply heat to the window jig 120 to effectively couple the window 140 to the display panel. The heat applied by the heating member may be transferred to the window jig fastening member 100. In order to prevent or substantially prevent the window jig fastening member 100 from being damaged by the heat, the heat dissipation member 110 may be disposed between the window jig fastening member 100 and the window jig 120.

The window jig 120 may be disposed on the bottom of the heat dissipation member 110. However, in one or more embodiments, the window jig 120 may be directly disposed on the bottom of the window jig fastening member 100. In this case, the heat dissipation member 110 may be omitted.

The window jig 120 may support the window 140 to couple (e.g., precisely couple) the window 140 to the display panel 150. The window 140 may be disposed inside the window jig 120. In one or more embodiments, the window 140 may come into contact with the window jig 120.

The window jig 120 may include a flat portion 130 and a protrusion portion 135. The flat portion 130 of the window jig 120 may be a portion coming into contact with a flat portion of the window 140. The protrusion portion 135 of the window jig 120 may be a portion coming into contact with a bent area of the window 140. The protrusion portion 135 may be defined as a portion protruding in a direction opposite to the first direction DR1 from an end of the flat portion 130 along a second direction DR2 perpendicular to the first direction DR1. In addition, the protrusion portion 135 may be defined as a portion protruding in a direction opposite to the first direction DR1 from an end of the flat portion 130 along a direction opposite to the second direction DR2. In one or more embodiments, a portion of the protrusion portion 135 coupled to the flat portion 130 may have a right angle shape as shown in FIG. 1A. In another embodiment, the portion of the protrusion portion 135 coupled to the flat portion 130 may have a curved shape as shown in FIG. 1B. Herein, descriptions with reference to FIG. 1A may be equivalently applied to the lamination apparatus of FIG. 1B.

In one or more embodiments, the window jig 120 may include a plurality of protrusion portions 135. For example, when the window 140 is bent on two sides, the window jig 120 may include two protrusion portions 135. In another embodiment, for example, when the window 140 is bent on four sides, the window jig 120 may include four protrusion portions 135.

The lamination apparatus may couple the display panel 150 and the window 140 to each other by pressing the display panel 150 in the first direction DR1. The window 140 may have both ends bent to cover side portions of the display panel 150. The bent area of the window 140 may come into contact with the protrusion portion 135. Due to the bent area, when the display panel 150 is coupled to the window 140, air bubbles may be generated between the display panel 150 and the window 140. In this case, the air bubbles may be visually recognized at an outside, and, thus, a display quality of the display device may be deteriorated.

In addition, when the pressure applied to the display panel 150 or the like increases while the lamination device presses the display panel 150, cracks may be generated in the display panel 150 and the window 140. Accordingly, it is desirable that the lamination apparatus performs the lamination process without increasing the pressure at a certain range (e.g., a predetermined range) or higher. In addition, when the pressurized area is wide, the pressure may not be uniformly transferred to the display panel 150. In this case, an edge area and a corner area of the display panel 150 may not be properly coupled to the window 140.

Accordingly, the lamination apparatus according to the present invention, includes the heating member, such that the display panel 150 and the window 140 may be effectively coupled to each other without increasing a pressure by applying heat.

In one or more embodiments, the window jig 120 may include the heating member. For example, the heating member may be disposed on the flat portion 130 of the window jig 120. The heating member may be inserted into the flat portion 130. In an embodiment, the heating member may be formed integrally with the flat portion 130.

In one or more embodiments, the heating member may be disposed over the whole of the flat portion 130. In the embodiments, the heating member may be heat the flat portion 130 as a whole. In this case, the flat portion 130 may be a heating area HA as a whole.

However, in one or more embodiments, the heating member may be disposed over the whole of the flat portion 130, such that only a part of the flat portion 130 may be heated. In this case, the heating member may not heat the remaining parts other than the above part of the flat portion 130. Accordingly, only the part of the flat portion 130 may be the heating area HA.

In one or more embodiments, the heating member may be locally disposed only in a part of the flat portion 130. For example, the heating member may be disposed only in a part to be heated in the flat portion 130 (such as a corner area and a corner area). Accordingly, the heating member may heat only the part of the flat portion 130. In this case, only the part of the flat portion 130 may be the heating area HA.

In the embodiments, the heating member may be defined as any of various members capable of generating heat. For example, the heating member may include a cartridge heater. The cartridge heater may be separately inserted into the window jig 120. In one or more embodiments, the cartridge heater may include an electrical resistance member. For example, the cartridge heater may include a coil as an electric resistor. Accordingly, the cartridge heater may convert a current flowing inside the cartridge into heat.

In one or more embodiments, for example, the heating member may include a ceramic heater. The ceramic heater itself may serve as a resistor. Accordingly, the current applied to the ceramic heater may be converted into heat. In an embodiment, the ceramic heater may be formed integrally with the window jig 120. In one or more embodiments, the window jig 120 may include a ceramic material. The ceramic material may serve as an electric resistor. Accordingly, a portion in which the window jig 120 includes the ceramic material may serve as a heater. The ceramic heater may be freely processed in shape, and various shapes may be embodied.

In one or more embodiments, for example, the heating member may include an infrared lamp. The infrared lamp may partially heat the window jig 120 by emitting light. The light emitted from the infrared lamp may be high-temperature light. In one or more embodiments, the infrared lamp may serve as an illumination through the light to recognize an alignment mark indicated to precisely couple the window 140 and the display panel 150.

In one or more embodiments, as shown in FIG. 1A, the heating member may be heat the flat portion 130 as a whole. Accordingly, the flat portion 130 may correspond to the heating area HA as a whole. In this case, the heating member may be disposed to overlap the flat portion 130. For example, the cartridge heater may be inserted into the flat portion 130. In one or more embodiments, the flat portion 130 may include a ceramic material. In one or more embodiments, the infrared lamp may be disposed in the flat portion 130.

In the embodiments, the heat may also be transferred to the protrusion portion 135 by the heating member. Accordingly, air bubbles generated in the bent side portions of the window 140 and the display panel 150 may be prevented or substantially prevented. In addition, the bent side portions of the window 140 and the display panel 150 may be effectively coupled to each other even when the pressure is insufficiently applied to the side portions.

In the embodiments, as shown in FIG. 2, the heating member may partially heat only a certain area of the flat portion 130. Accordingly, both ends of the flat portion 130 may be the heating area HA. Accordingly, when the window 140 is coupled to the display panel 150, the heating member may partially heat the window jig 120, such that the display panel 150 and the window 140 may be effectively coupled to each other. For example, the heating member may be disposed partially in the flat portion 130. In one or more embodiments, the heating member may be disposed over the whole of the flat portion 130 and may partially heat the flat portion 130.

In the embodiments, the heat may also be transferred to the protrusion portion 135 by the heating member. Accordingly, when the window 140 and the display panel 150 are coupled to each other, the air bubbles generated in the side portions may be prevented or substantially prevented. In addition, even when the pressure is insufficiently applied to the side portions, the side portions of the window 140 and the display panel 150 may be effectively coupled to each other.

In one or more embodiments, the heating member may be disposed not only in the flat portion 130 but also in the protrusion portion 135. In this case, the flat portion 130 and the protrusion portion 135 may be the heating area HA. In the embodiments, heat may also be transferred to the flat portion 130 by the heating member.

FIGS. 4 to 10 are plan views showing embodiments of a window jig included in the lamination apparatus of FIG. 1A.

Referring to FIGS. 1A and 4 to 10, the window jig 120 may include the heating member. In the embodiments, the heating member may include the cartridge heater, the ceramic heater, the infrared lamp, and the like.

The flat portion 130 may include a first sidewall area 10a, a second sidewall area 10b, a third sidewall area 10c, and a fourth sidewall area 10d. The second sidewall area 10b may face the first sidewall area 10a in the second direction DR2. The third sidewall area 10c may be perpendicular to the first sidewall area 10a. The fourth sidewall area 10d may face the third sidewall area 10c in the third direction DR3.

In addition, the flat portion 130 may include a first corner area 20a, a second corner area 20b, a third corner area 20c, and a fourth corner area 20d. The first corner area 20a may be adjacent to the first sidewall area 10a and the third sidewall area 10c. The second corner area 20b may be adjacent to the second sidewall area 10b and the third sidewall area 10c. The third corner area 20c may be adjacent to the second sidewall area 10b and the fourth sidewall area 10d. The fourth corner area 20d may be adjacent to the first sidewall area 10a and the fourth sidewall area 10d.

Figure 4:
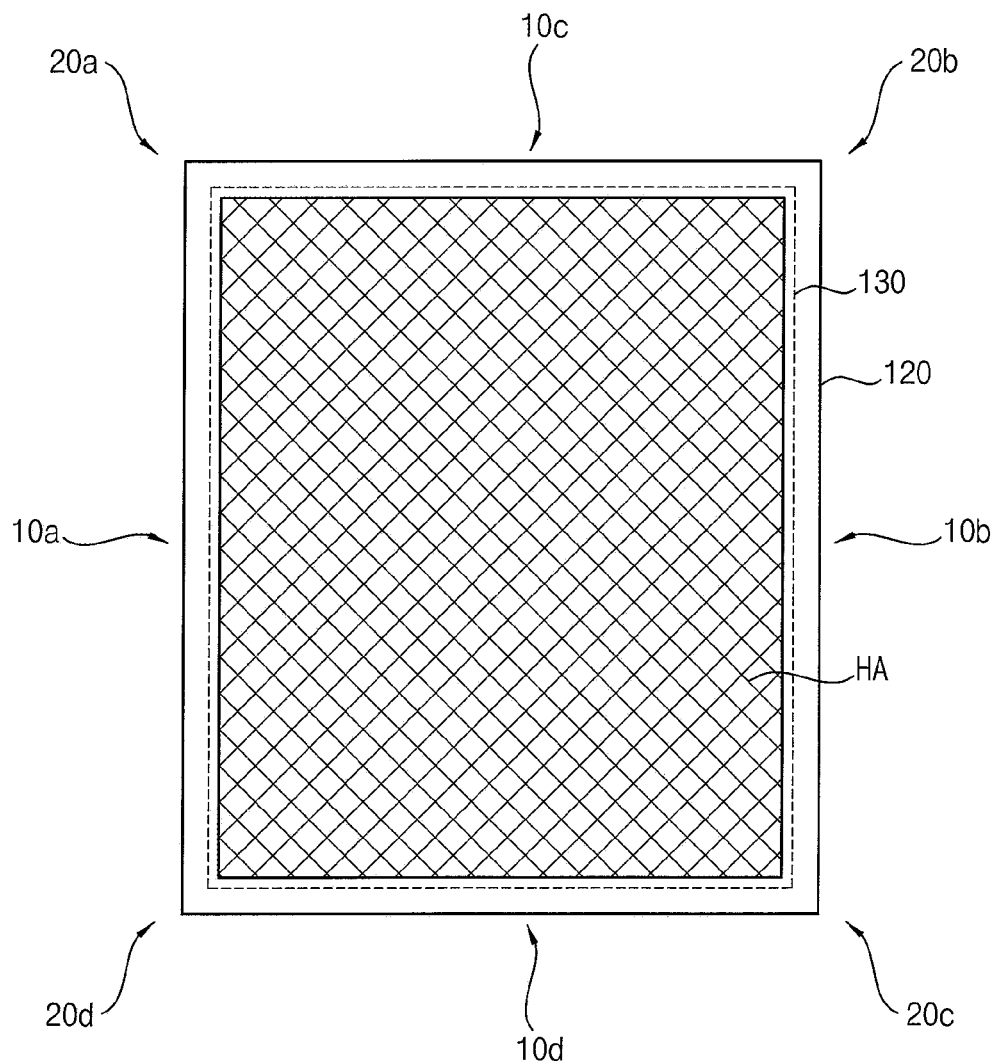
FIGS. 4 to 10 are plan views showing embodiments of a window jig included in the lamination apparatus of FIG. 1A.

In the embodiments, as shown in FIG. 4, the heating member may be disposed to overlap the flat portion 130, and may apply heat to the flat portion 130 as a whole. Accordingly, the flat portion 130 may be a heating area HA as a whole.

For example, the cartridge heater may be inserted into the flat portion 130. The cartridge heater may include an electrical resistance member (such as a coil). The cartridge heater may overlap the whole of the flat portion 130. The cartridge heater may heat the flat portion 130 as a whole. In this case, the electrical resistance member may be disposed inside the cartridge heater as a whole. Heat by the cartridge heater may be transferred to the protrusion portion 135 of FIG. 1A.

In one or more embodiments, the heating member may be disposed in the flat portion 130, and heat may be applied to an edge and a center of the flat portion 130 to different degrees. For example, the heating member may heat the edge of the flat portion 130 at a relatively high temperature, and may heat the center at a relatively low temperature. Accordingly, the lamination apparatus may effectively couple edges of the display panel 150 to which the pressure during the lamination process is applied relatively weakly.

For example, the flat portion 130 may include a ceramic material. The ceramic material may be an electrical resistance material. Accordingly, the window jig 120 may convert electrical energy applied to the ceramic material into thermal energy. Accordingly, the ceramic material may serve as a ceramic heater.

In one or more embodiments the flat portion 130 may include the ceramic material as a whole. In this case, the flat portion 130 may be a heating area HA as a whole. Heat generated by the ceramic material may be transferred to the protrusion portion 135. In one or more embodiments, the edge of the flat portion 130 may include the ceramic material relatively more. Accordingly, the lamination apparatus may effectively couple edges of the display panel 150 to which the pressure during the lamination process is applied relatively weakly.

In one or more embodiments, the heating member may be disposed to overlap the flat portion 130, and may heat only a part of the flat portion 130. However, in one or more embodiments, the heating member may be locally disposed only in a part of the flat portion 130.

Figure 5:
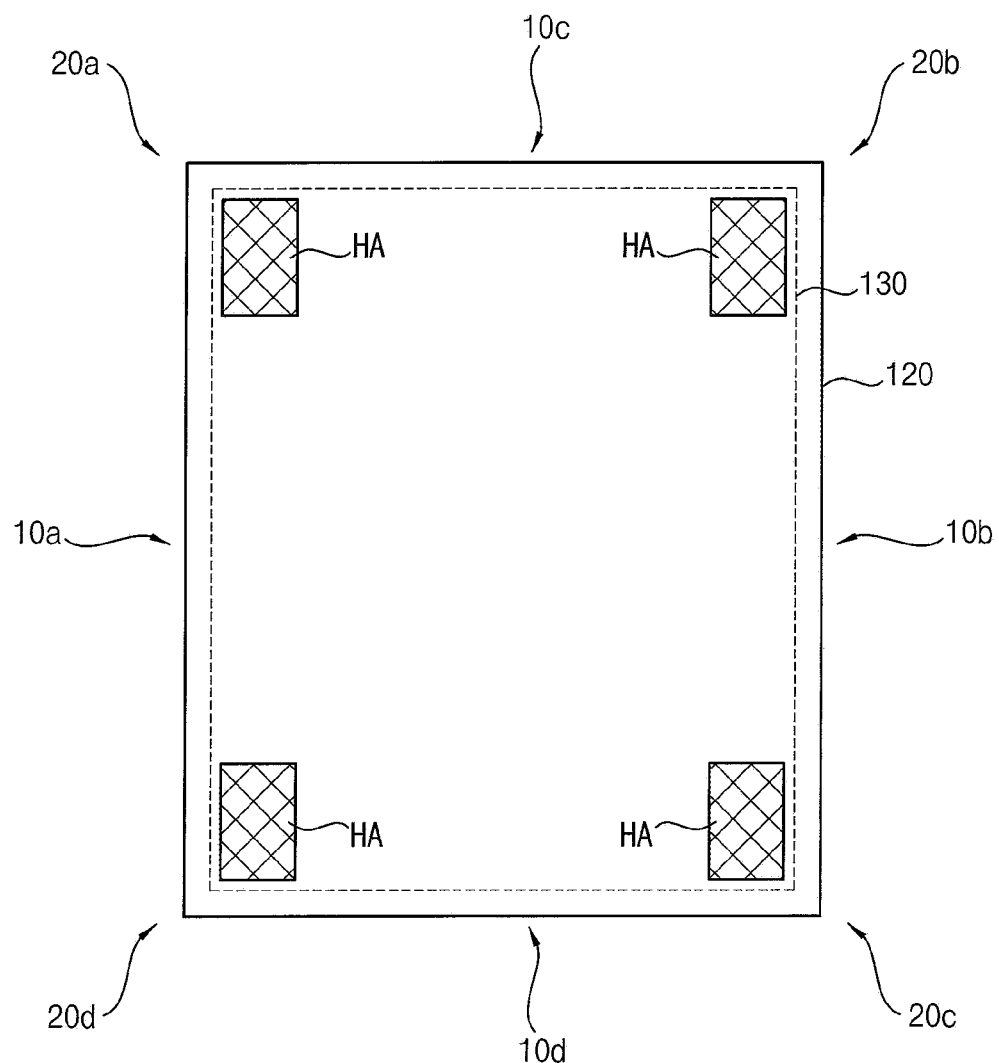

In the embodiments, the lamination apparatus may not apply a sufficient pressure to areas corresponding to the first to fourth corner areas 20a, 20b, 20c, and 20d of the flat portion 130. Accordingly, as shown in FIG. 5, in one or more embodiments, the heating member may heat only the first to fourth corner areas 20a, 20b, 20c, and 20d of the flat portion 130. Accordingly, only the first to fourth corner areas 20a, 20b, 20c, and 20d of the flat portion 130 may be the heating area HA. Accordingly, the lamination apparatus may effectively couple the display panel 150 and the window 140 to each other.

For example, the cartridge heater may be inserted into the first to fourth corner areas 20a, 20b, 20c, and 20d. However, the cartridge heater may be inserted into the flat portion 130, and electrical resistance members included in the cartridge heater may be disposed to overlap the first to fourth corner areas 20a, 20b, 20c, and 20d. In one or more embodiments, the first to fourth corner areas 20a, 20b, 20c, and 20d may include a ceramic material. However, in one or more embodiments, the first to fourth corner areas 20a, 20b, 20c, and 20d may include an infrared lamp.

The cartridge heater to be described below may be inserted in the heating area HA. The heating area HA to be described below may include a ceramic material. In one or more embodiments, an infrared lamp may be disposed in the heating area HA to be described below.

Figure 6:
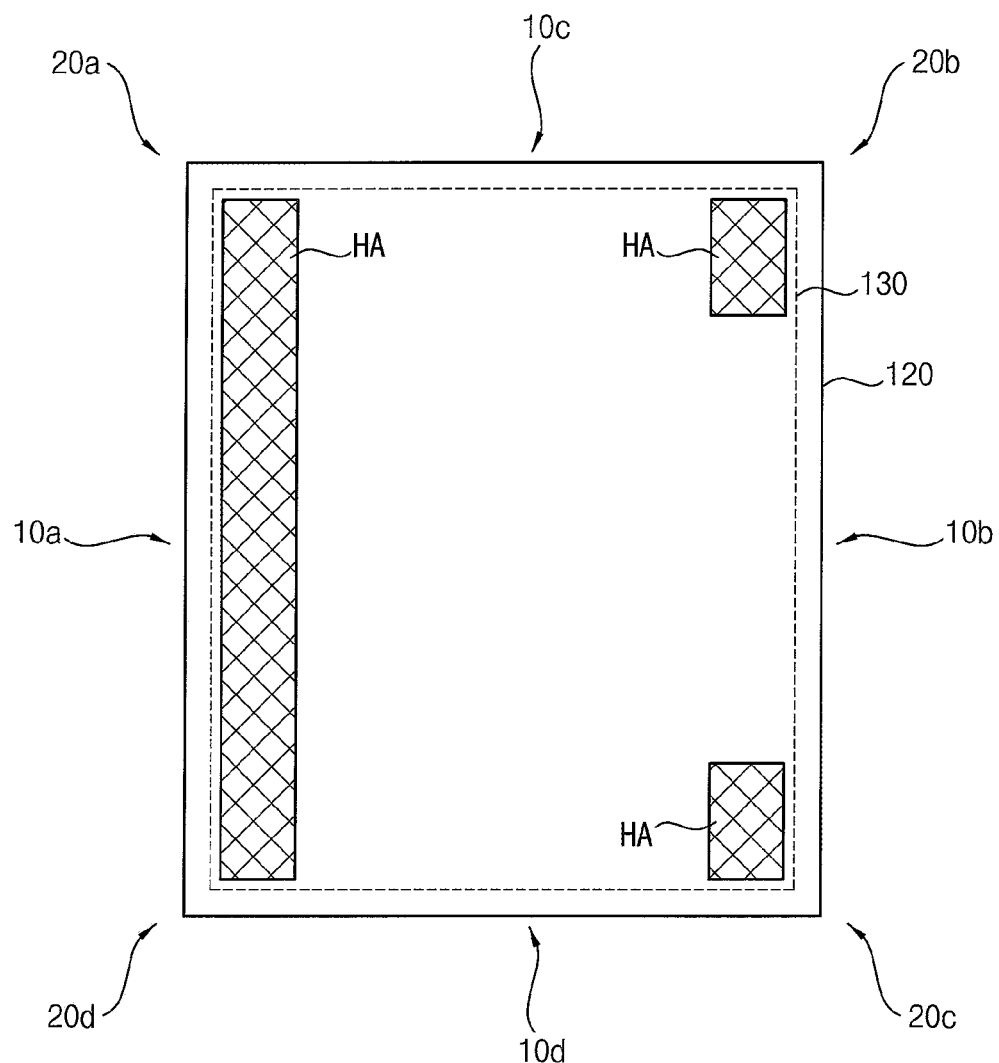

In one or more embodiments, the heating member may heat at least one sidewall area of the flat portion 130. For example, as shown in FIG. 6, the heating member may heat the first sidewall area 10a positioned in the second direction DR2 perpendicular to the first direction DR1 of the flat portion 130. The heating member may also heat both ends of the second sidewall area 10b facing the first sidewall area 10a of the flat portion 130. In this case, the first sidewall area 10a and both ends of the second sidewall area 10b of the flat portion 130 may be the heating area HA.

Figure 7:
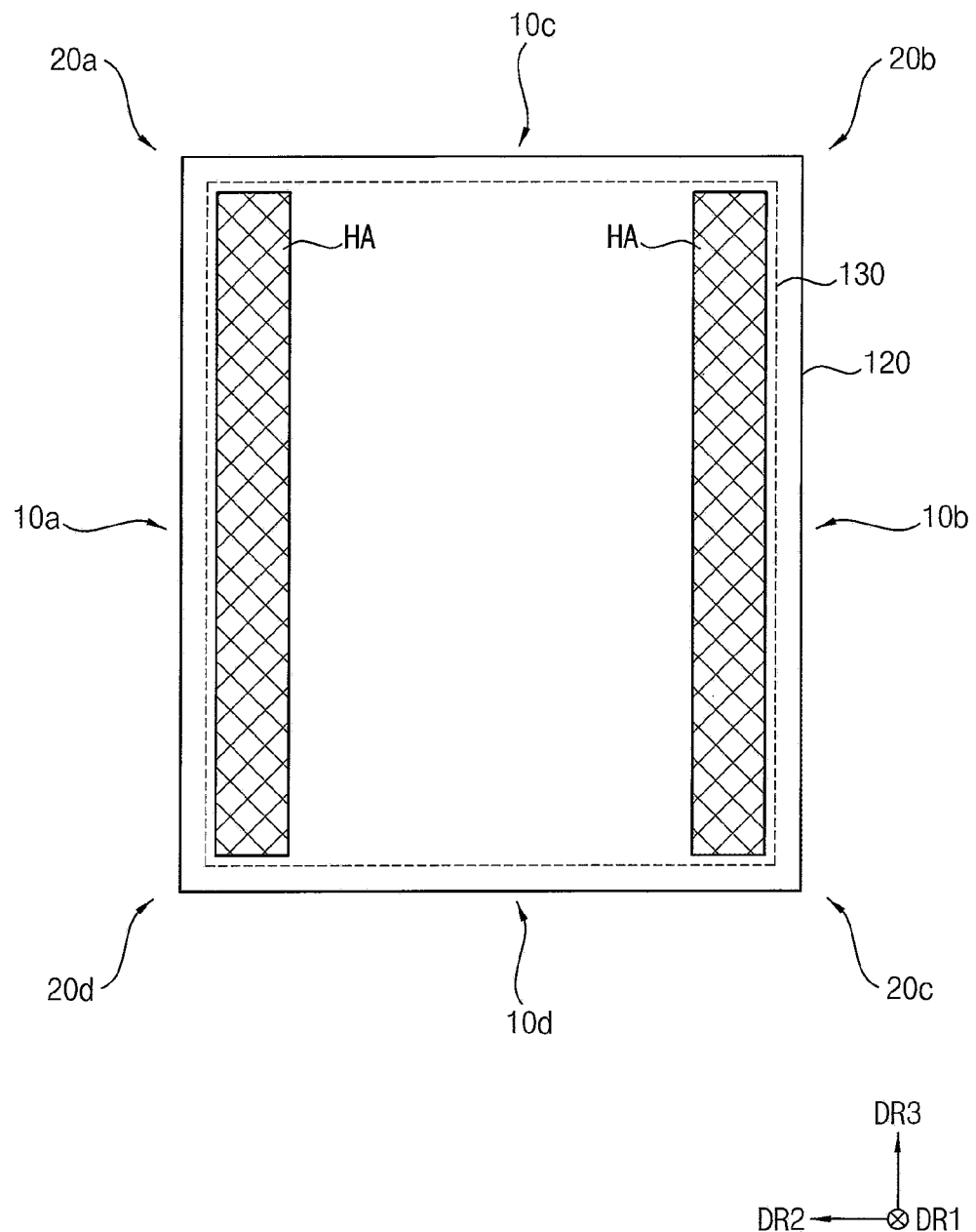

In one or more embodiments, as shown in FIG. 7, the heating member may heat the first sidewall area 10a together with the second sidewall area 10b of the flat portion 130. Accordingly, the first sidewall area 10a and the second sidewall area 10b of the flat portion 130 may be the heating area HA.

Figure 8:
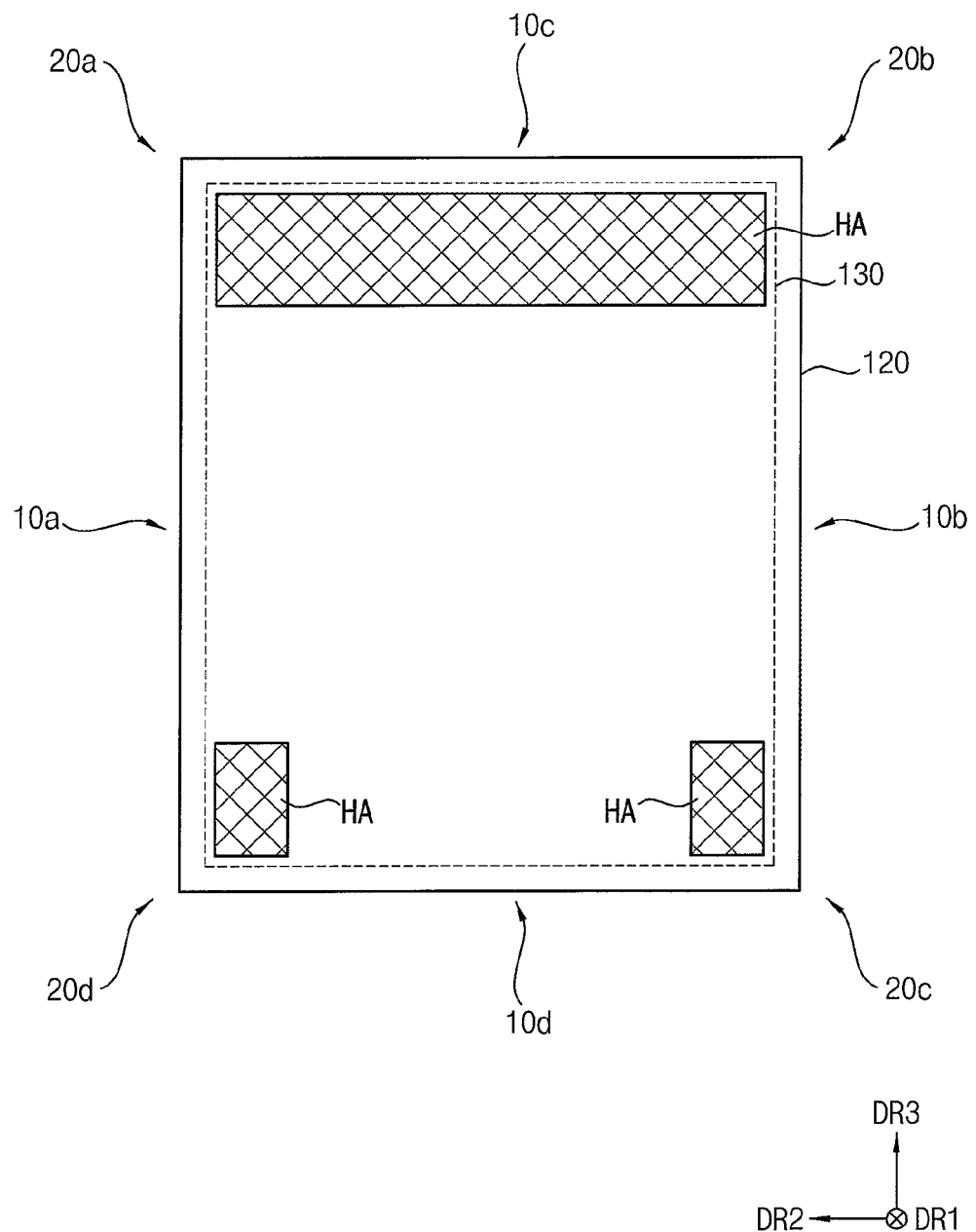

In one or more embodiments, as shown in FIG. 8, the heating member may heat the third sidewall area 10c positioned in the third direction DR3 of the flat portion 130. The heating member may also heat both ends of the fourth sidewall area 10d facing the third sidewall area 10c of the flat portion 130. Accordingly, the third sidewall area 10c and both ends of the fourth sidewall area 10d of the flat portion 130 may be the heating area HA.

Figure 9:
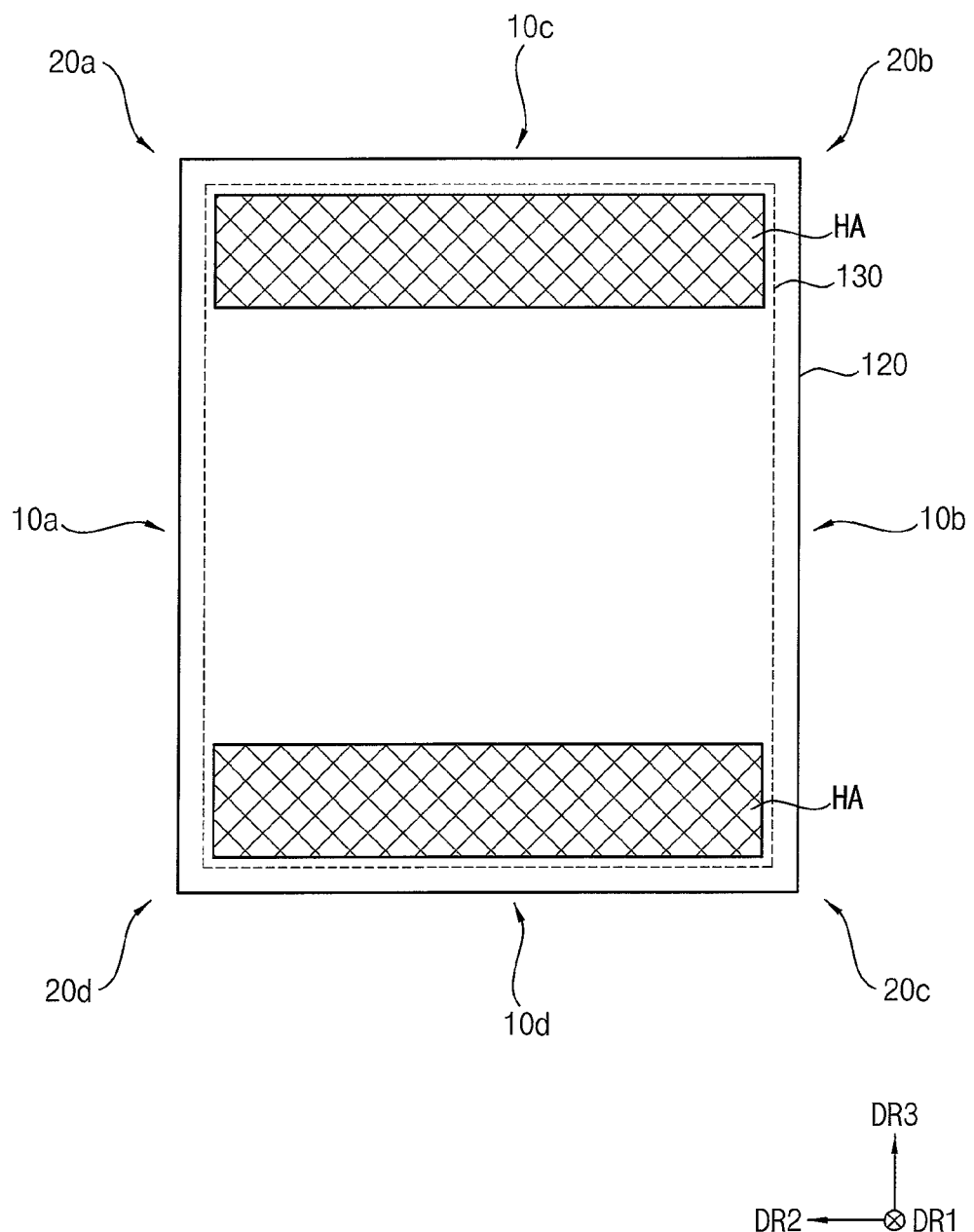

In one or more embodiments, as shown in FIG. 9, the heating member may heat the third sidewall area 10c together with the fourth sidewall area 10d of the flat portion 130. In this case, the third sidewall area 10c and the fourth sidewall area 10d of the flat portion 130 may be the heating area HA.

Figure 10:
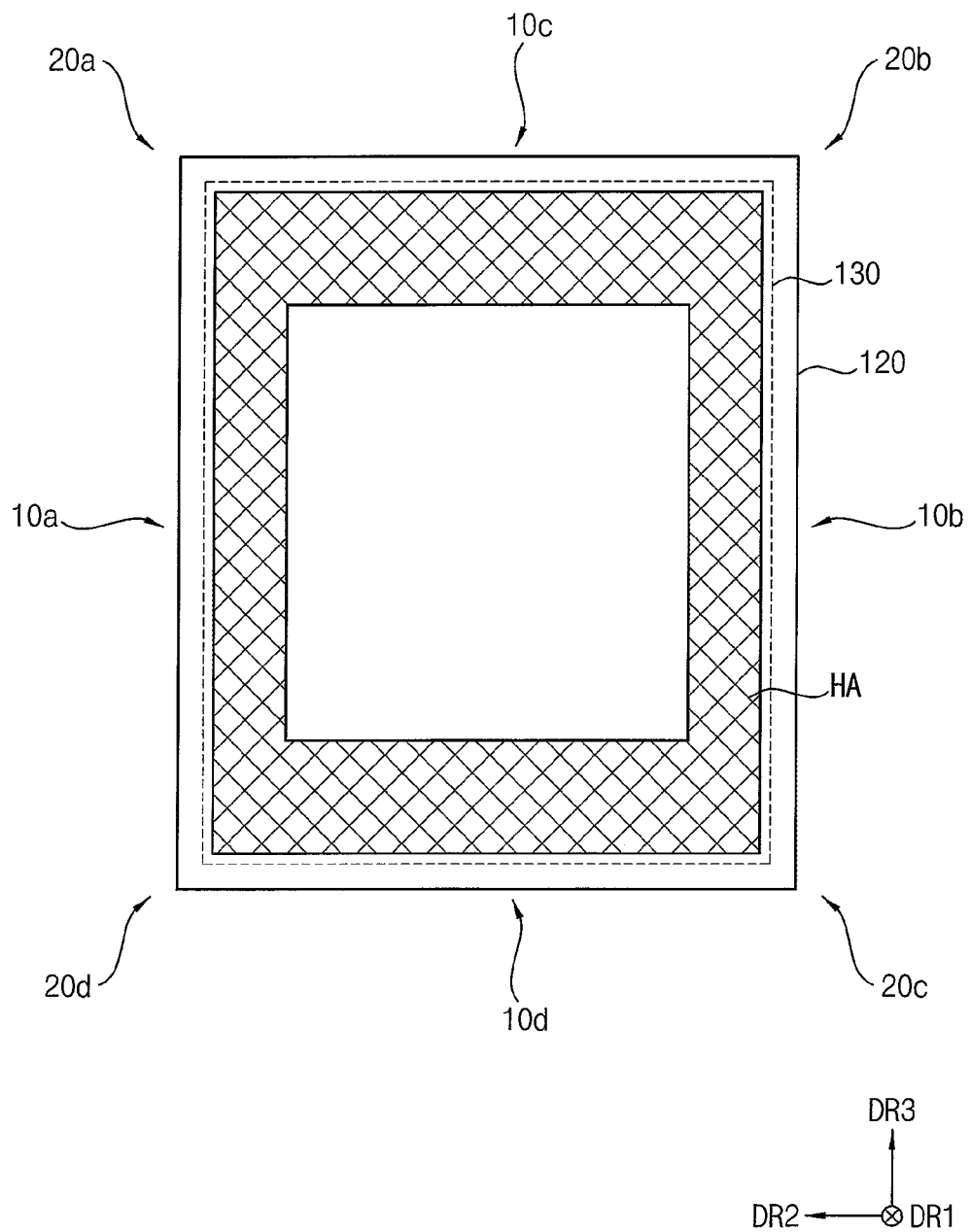

In one or more embodiments, as shown in FIG. 10, the heating member may heat edges of the flat portion 130. In this case, the first to fourth sidewall areas 10a, 10b, 10c, and 10d of the flat portion 130 may be the heating area HA.

When the display panel 150 and the window 140 are coupled to each other using the window jig 120 while partially heating the window jig 120, the generation of air bubbles may be suppressed more than when the display panel 150 and the window 140 are coupled at room temperature. For example, the heating member may heat the window jig 120 to about 50° C. to about 100° C. When the heating member is heated to about 100° C. or more, other components (e.g., the window jig fastening member 100 of FIG. 1A) may be affected by heat. When the heating member is heated to about 50° C. or less, the lamination apparatus may not sufficiently suppress the generation of air bubbles. Accordingly, the lamination apparatus may fail to effectively couple the window 140 and the display panel 150 to each other. Accordingly, when the lamination process is in progress, the heating member may heat the window jig 120 to about 50° C. to about 100° C.

Due to the heating member, the lamination apparatus may effectively couple the window 140 and the display panel 150 even applying a pressure equivalent to the pressure applied when the window 140 and the display panel 150 are coupled at room temperature. Accordingly, the lamination apparatus does not need to apply a high pressure to couple the window 140 and the display panel 150. The lamination apparatus, due to the heating member, may prevent or substantially prevent cracks occurring in the window 140, the display panel 150, and the like.

Figure 11:
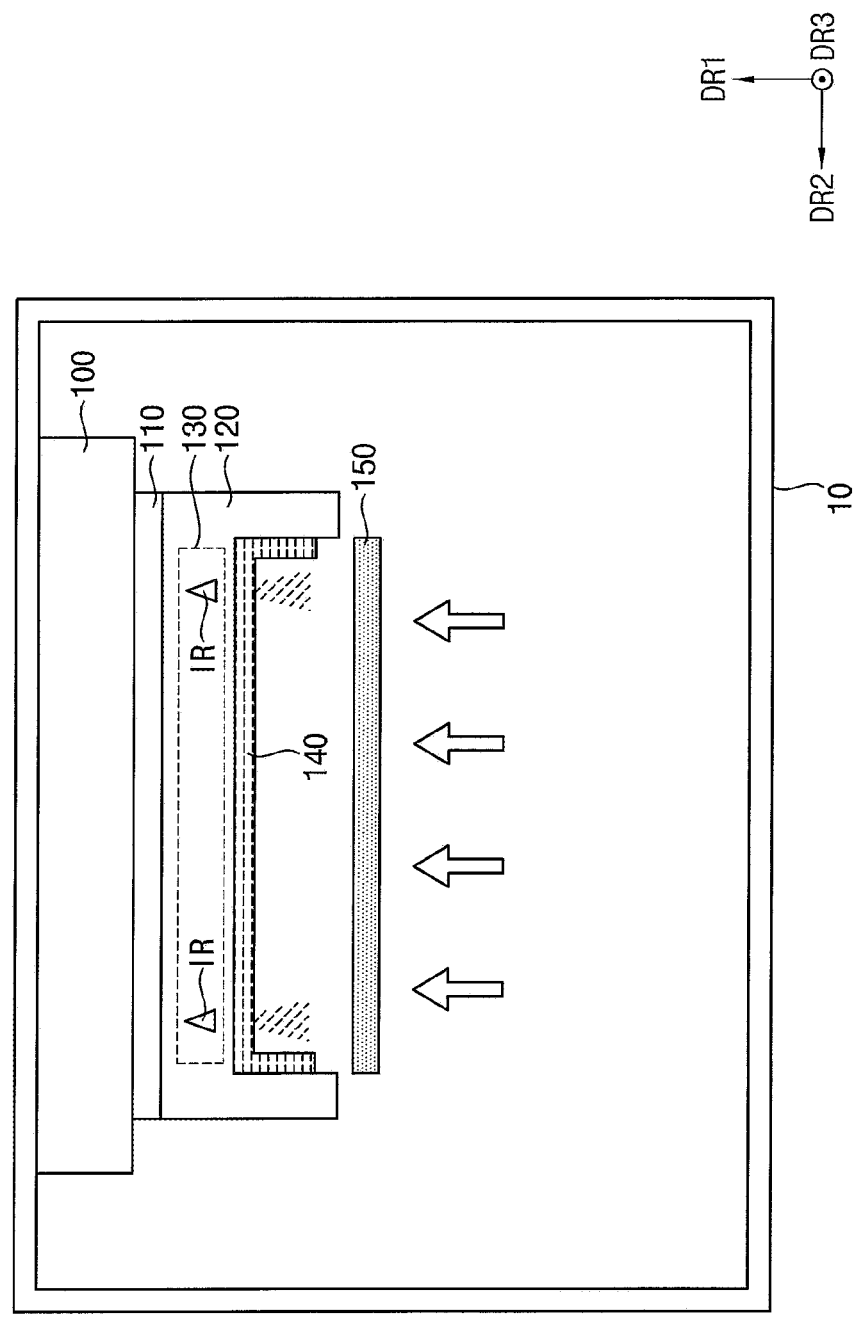
FIG. 11 is a cross-sectional view showing a lamination apparatus according to an embodiment of the present invention.

FIG. 11 is a cross-sectional view showing a lamination apparatus according to one or more embodiments of the present invention. FIG. 11 is a view for illustrating an example in which the lamination apparatus of FIG. 1A includes an infrared lamp IR. Accordingly, further description for duplicate components may be omitted.

Referring to FIG. 11, the window jig 120 may include the infrared lamp IR. The infrared lamp IR may emit light having a high temperature. Accordingly, the window jig 120 may apply heat to the window 140, the display panel 150, and the like in the process of coupling the window 140 to the display panel 150.

In one or more embodiments, the light emitted from the infrared lamp IR may serve as illumination for recognizing an alignment mark. The light emitted from the infrared lamp IR may pass through the window 140. In other words, the infrared lamp IR may enable the display panel 150 and the window 140 to be aligned (e.g., precisely aligned).

Figure 13:
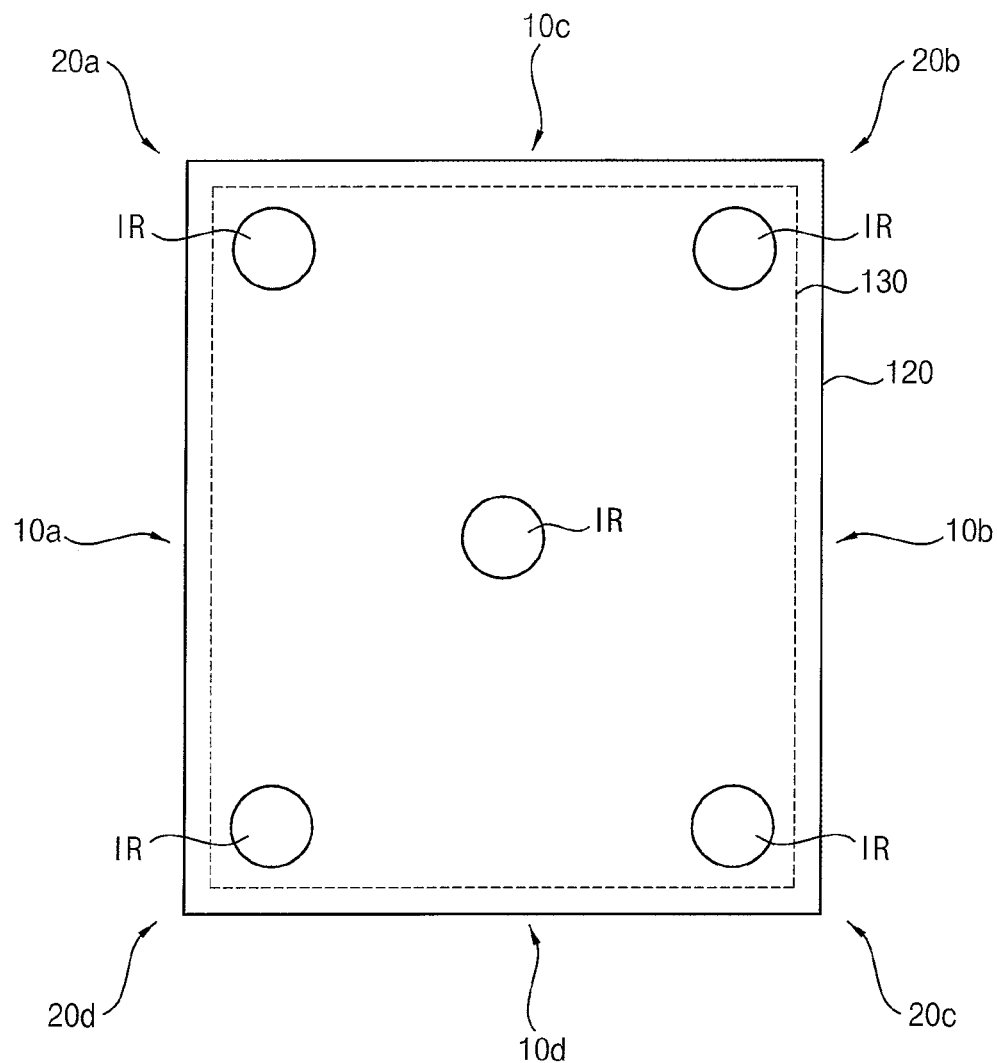

FIGS. 12 and 13 are plan views showing embodiments of a window jig included in the lamination apparatus of FIG. 11.

Referring to FIGS. 12 and 13, in one or more embodiments, as shown in FIG. 12, the infrared lamp IR may be disposed in the first to fourth corner areas 20a, 20b, 20c, and 20d of the flat portion 130. However, in one or more embodiments, as shown in FIG. 13, the infrared lamp IR may also be disposed in a center of the flat portion 130. However, this is merely an example. For example, the infrared lamp IR may be disposed in various areas within the flat portion 130 to heat the flat portion 130.

Figure 14:
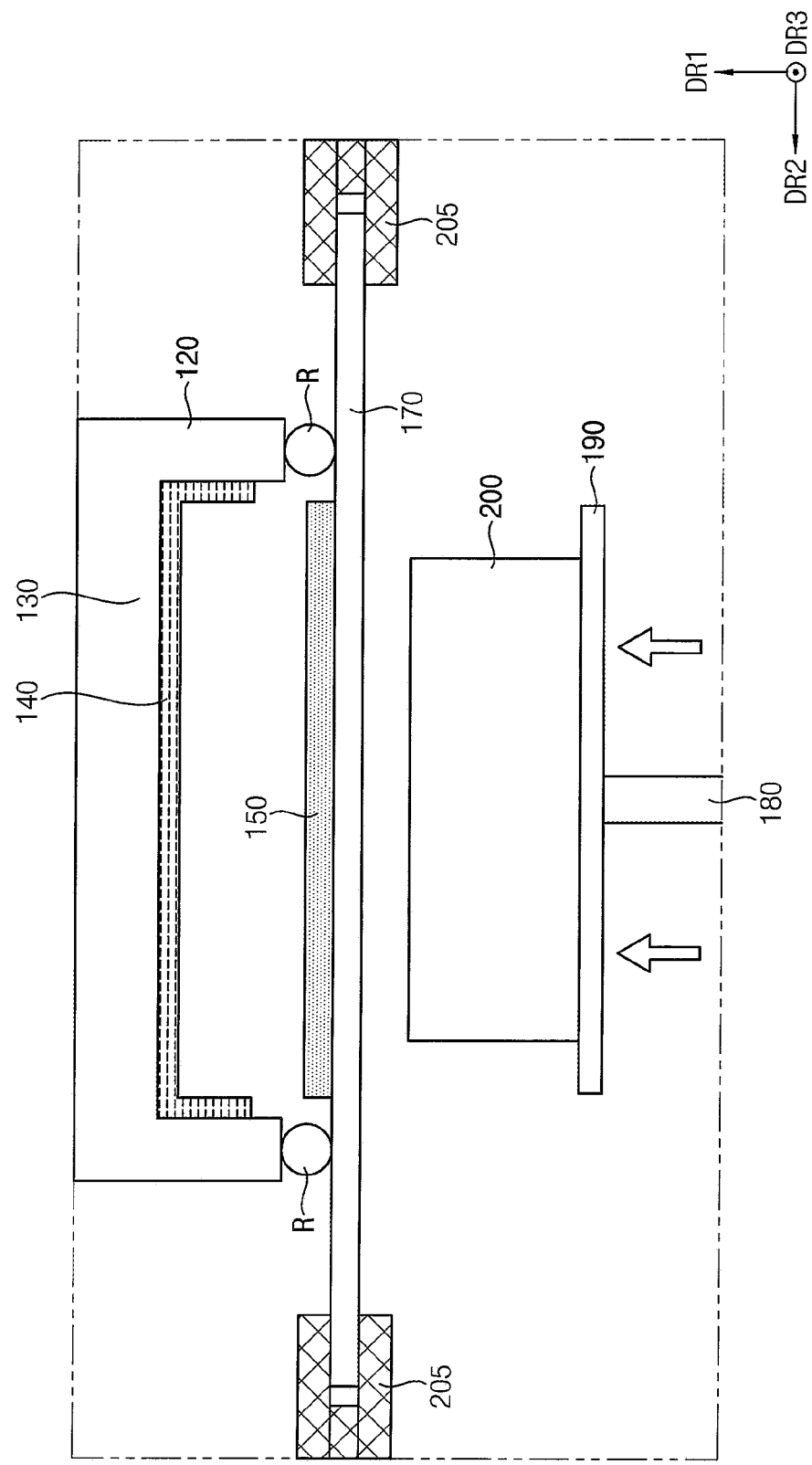
FIGS. 14 and 15 are cross-sectional views showing a lamination method using a lamination apparatus according to one or more embodiments of the present invention.
Figure 15:
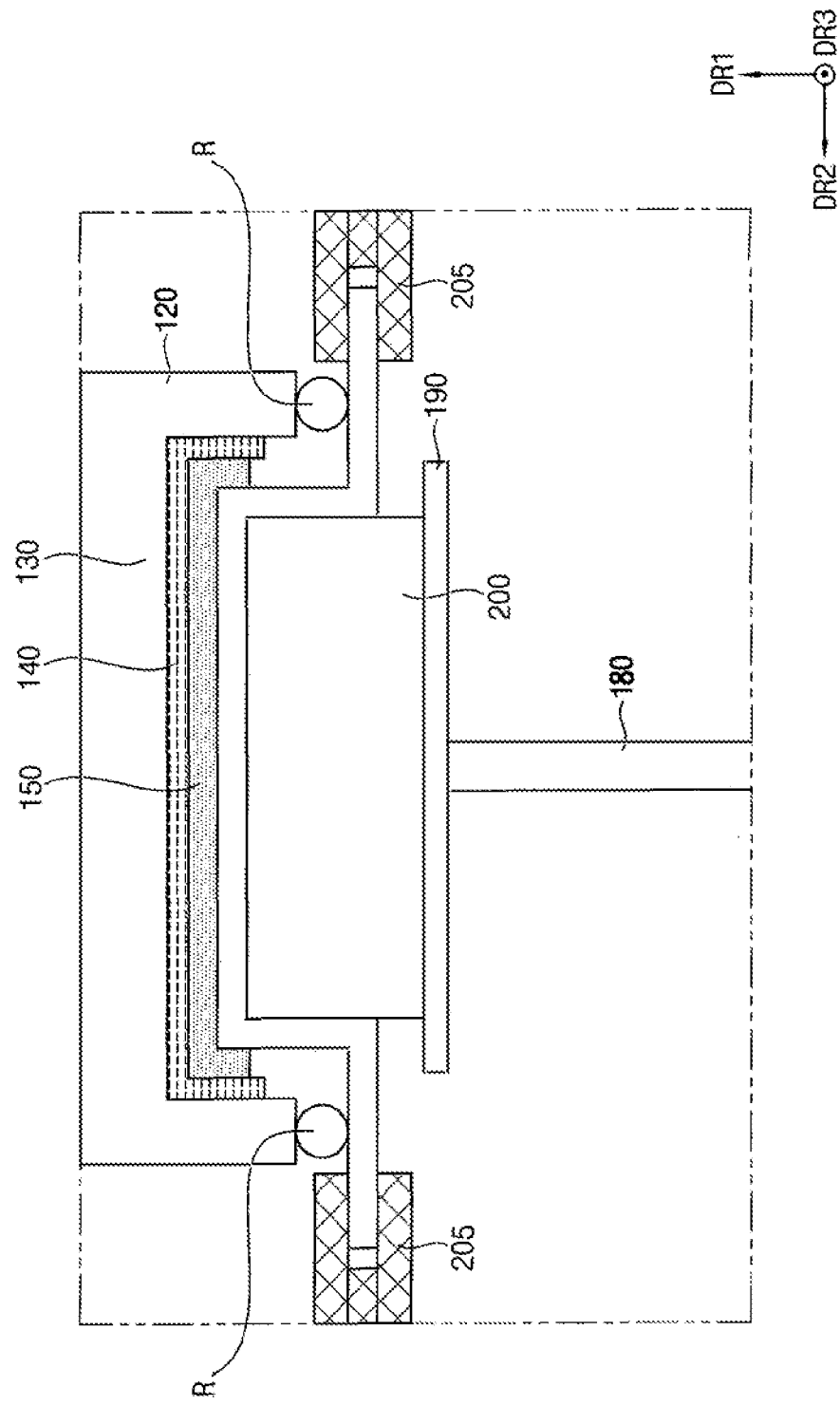

FIGS. 14 and 15 are cross-sectional views showing a lamination method using the lamination apparatus according to one or more embodiments of the present invention. FIGS. 14 and 15 are enlarged views showing a part of the lamination apparatus of FIG. 1A. Accordingly, further description for duplicate components may be omitted.

Referring to FIGS. 1A, 14, and 15, the lamination apparatus may include a guide member (e.g., a guide film) 170, an extension member 180, a support member 190, a pressing member 200, and a fixing member 205.

The display panel 150 may be disposed on the guide member 170. The fixing member 205 may fix the guide member 170. The fixing member 205 may be connected to the chamber 10.

The pressing member 200 may be disposed on the support member 190. The support member 190 may be connected to the extension member 180. The extension member 180 may extend in the first direction DR1. The extension member 180 may move the pressing member 200 in the first direction DR1. Accordingly, the pressing member 200 may press the guide member 170 and the display panel 150 in the first direction DR1 to couple the display panel 150 to the window 140. In one or more embodiments, the window jig 120 may heat the flat portion 130 through the heating member in order to effectively couple the display panel 150 to the window 140. For example, the lamination apparatus may apply heat to the window 140 through the heating member, and then couple the window 140 and the display panel 150 to each other. In one or more embodiments, the heating member may be continuously heated while the lamination process is in progress.

When the heating member heats the window 140, the lamination apparatus may effectively couple the window 140 and the display panel 150 to each other even at a same pressure upon performing the lamination process at room temperature.

In one or more embodiments, both ends of the display panel 150 may be bent while the display panel 150 is coupled to the bottom surface of the window 140. Accordingly, the display panel 150 may display an image in the second direction DR2 as well as in a direction opposite to the second direction DR2.

In one or more embodiments, each end of the display panel 150 may be bent. Accordingly, the display panel 150 may also display an image in the second direction DR2, in a direction opposite to the second direction DR2, in the third direction DR3, and in a direction opposite to the third direction DR3.

In one or more embodiments, a roller R or the like may be additionally disposed on the guide member 170. The roller R may allow the guide member 170 to smoothly move into the window jig 120 in the process of coupling the window 140 and the display panel 150. In one or more embodiments, a plurality of rollers R may be disposed.

The lamination apparatus may couple the display panel 150 to the window 140 through the pressing member 200, and then unload the coupled display panel 150 and the window 140. Although the above lamination method has been described based on the lamination apparatus of FIG. 1, it is not limited thereto. For example, the lamination method may also be performed in the lamination apparatus of FIG. 16 to be described below.

Figure 16:
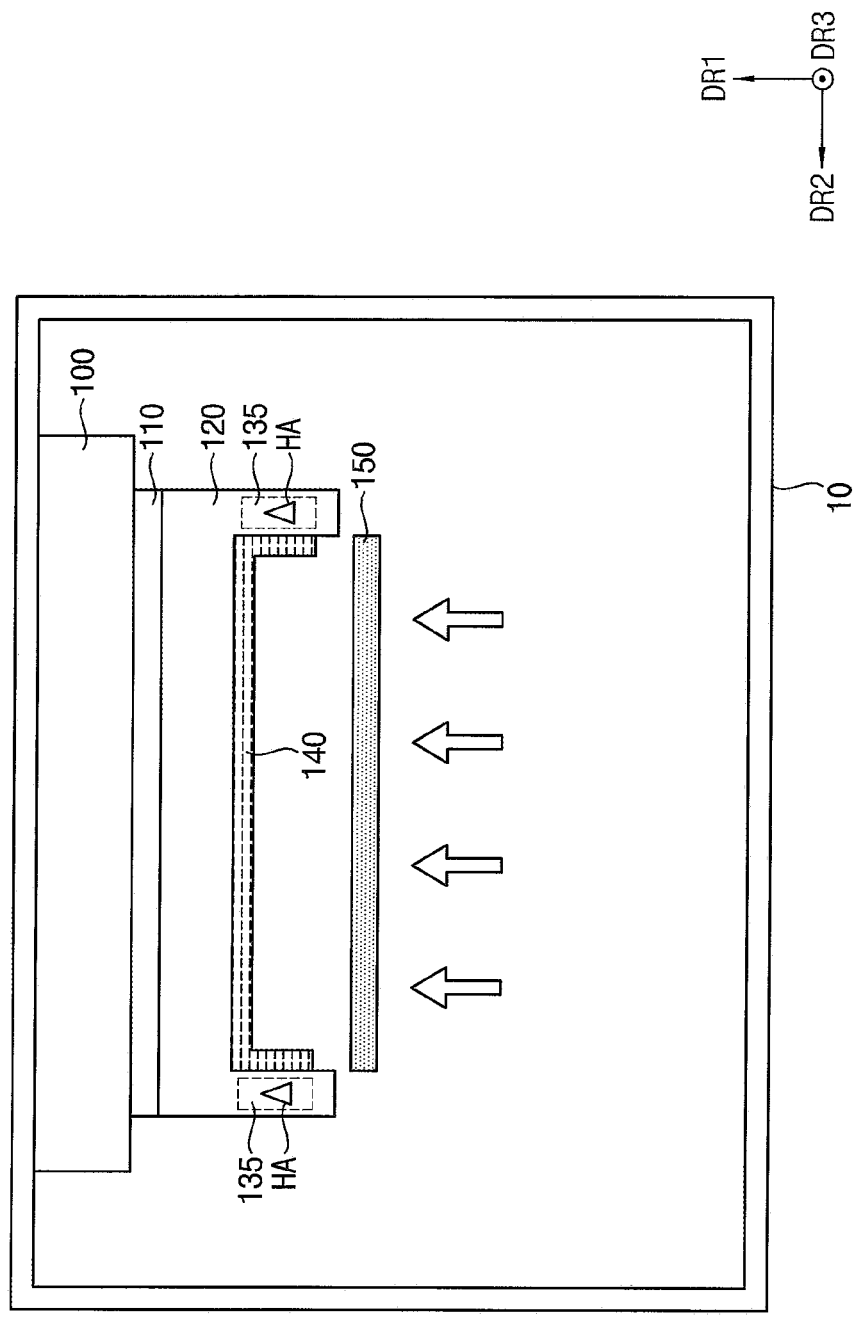
FIG. 16 is a cross-sectional view showing a lamination apparatus according to one or more embodiments of the present invention.

FIG. 16 is a cross-sectional view showing a lamination apparatus according to one or more embodiments of the present invention. The lamination apparatus of FIG. 16 may be substantially the same as the lamination apparatus of FIG. 1A, except for the location of the heating area HA. Accordingly, further description for duplicate components may be omitted.

Referring to FIG. 16, the window jig 120 may include a heating member such as any of the ceramic heater, the cartridge heater, and the infrared lamp. The window jig 120 may include the protrusion portion 135. The protrusion portion 135 may overlap a bent area of the window 140 in the second direction DR2.

The window jig 120 may include the heating member in the protrusion portion 135. The heating member may heat the protrusion portion 135. The lamination apparatus may apply heat to the protrusion portion 135 to reduce sizes and amounts of air bubbles generated when the window 140 and the display panel 150 are coupled.

In addition, the lamination apparatus may apply heat to the protrusion portion 135 to effectively couple side portions of the window 140 and the display panel 150 to which a pressure is not sufficiently applied.

To this end, the protrusion portion 135 may correspond to the heating area HA. For example, the cartridge heater may be inserted into the protrusion portion 135 or the infrared lamp may be disposed therein. However, in one or more embodiments, the protrusion portion 135 may include the ceramic material.

In the embodiments, the heat applied by the heating member may also be transferred to the flat portion of the window jig 120. Accordingly, the generation of air bubbles may be suppressed in a portion where the window 140 and the display panel 150 overlap each other in the first direction DR1.

Figure 17:
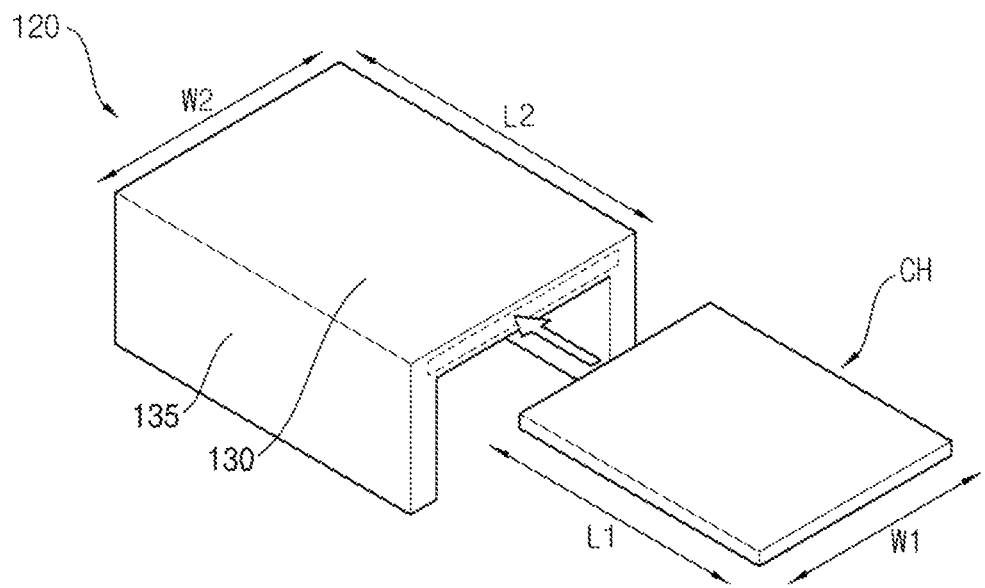
FIG. 17 is a view showing a cartridge heater according to one or more embodiments of the present invention.

FIG. 17 is a view showing a cartridge heater according to one or more embodiments of the present invention. FIG. 17 may correspond to a window jig for coupling the above-described two-sided bent window and the display panel.

Referring to FIGS. 1A, 1B and 17, a cartridge heater CH may be inserted into the window jig 120. Although FIG. 17 shows that a width W1 of the cartridge heater CH is substantially the same as a width W2 of the flat portion 130, embodiments are not limited thereto. For example, the width W1 of the cartridge heater CH may be smaller than the width W2 of the flat portion 130. In addition, a length L1 of the cartridge heater may be substantially the same as a length L2 of the flat portion 130, or may be smaller than the length L2 of the flat portion 130.

In addition, as shown in FIG. 17, even when the cartridge heater CH is disposed over the whole of the flat portion 130 of the window jig 120, the cartridge heater CH may partially heat the flat portion 130 of the window jig 120. In one or more embodiments, the cartridge heater CH may only partially include the electrical resistance member. For example, the cartridge heater CH may include the electrical resistance member only in the edge area. In one or more embodiments, the cartridge heater CH may include the electrical resistance member only in the corner area. Accordingly, the cartridge heater CH may include electrical resistance members at various positions within a range for partially heating the flat portion 130 of the window jig 120.

Figure 18:
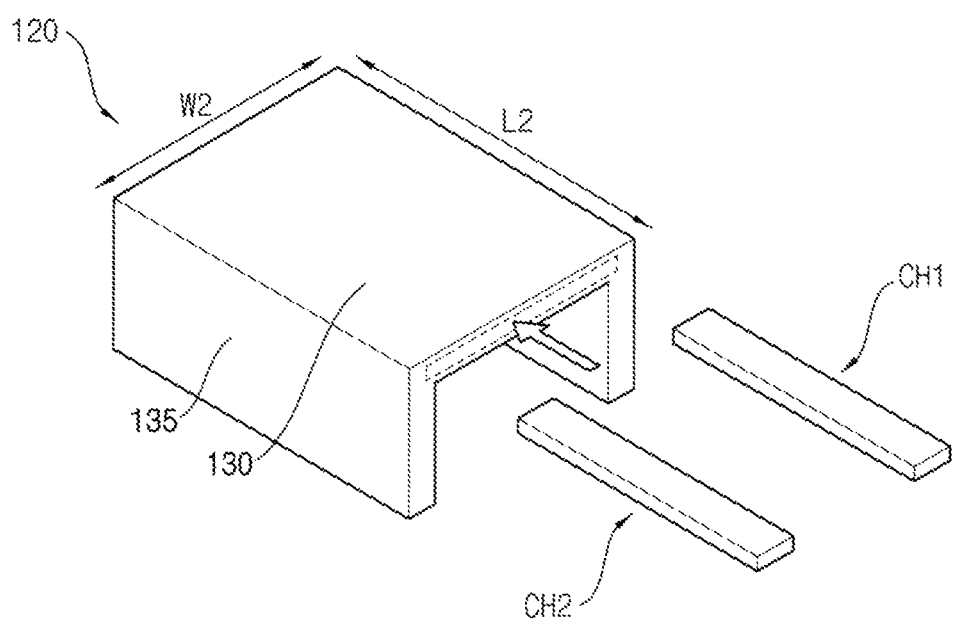
FIG. 18 is a view showing a cartridge heater according to one or more embodiments of the present invention.

FIG. 18 is a view showing a cartridge heater according to one or more embodiments of the present invention. FIG. 18 may be substantially the same as FIG. 17, except that a plurality of cartridge heaters are provided. Accordingly, further description for duplicate components may be omitted.

Referring to FIGS. 1A, 1B, and 18, a first cartridge heater CH1 and a second cartridge heater CH2 may be inserted into the flat portion 130. For example, the first cartridge heater CH1 and the second cartridge heater CH2 may be inserted into both ends of the flat portion 130 of the window jig 120. Although FIG. 18 shows that two cartridge heaters are provided, this is merely an example, and the present invention is not limited thereto. For example, the number of cartridge heaters may be four. In this case, the cartridge heaters may be disposed in each corner area of the flat portion. Accordingly, the cartridge heaters may be inserted without limitation within a range for partially heating the flat portion 130.

Accordingly, the lamination apparatus according to the embodiments of the present invention may include the window jig 120. The window jig 120 may include the heating member partially heating the window jig 120. Due to the heating member, the lamination apparatus may minimize or reduce the generation of air bubbles when coupling the window 140 and the display panel 150 disposed in the window jig 120. In addition, due to the heating member, the lamination apparatus may effectively couple the window 140 and the display panel 150 even when a low pressure is applied.

Although FIGS. 17 and 18 have been described based on the window jig for coupling the two-sided bent window and the display panel, the descriptions with reference to FIGS. 17 and 18 may be equivalently applied to a window jig for coupling a four-sided bent window and a display panel. However, in this case, the window jig 120 may have a structure including four protrusion portions 135.

Figure 19A:
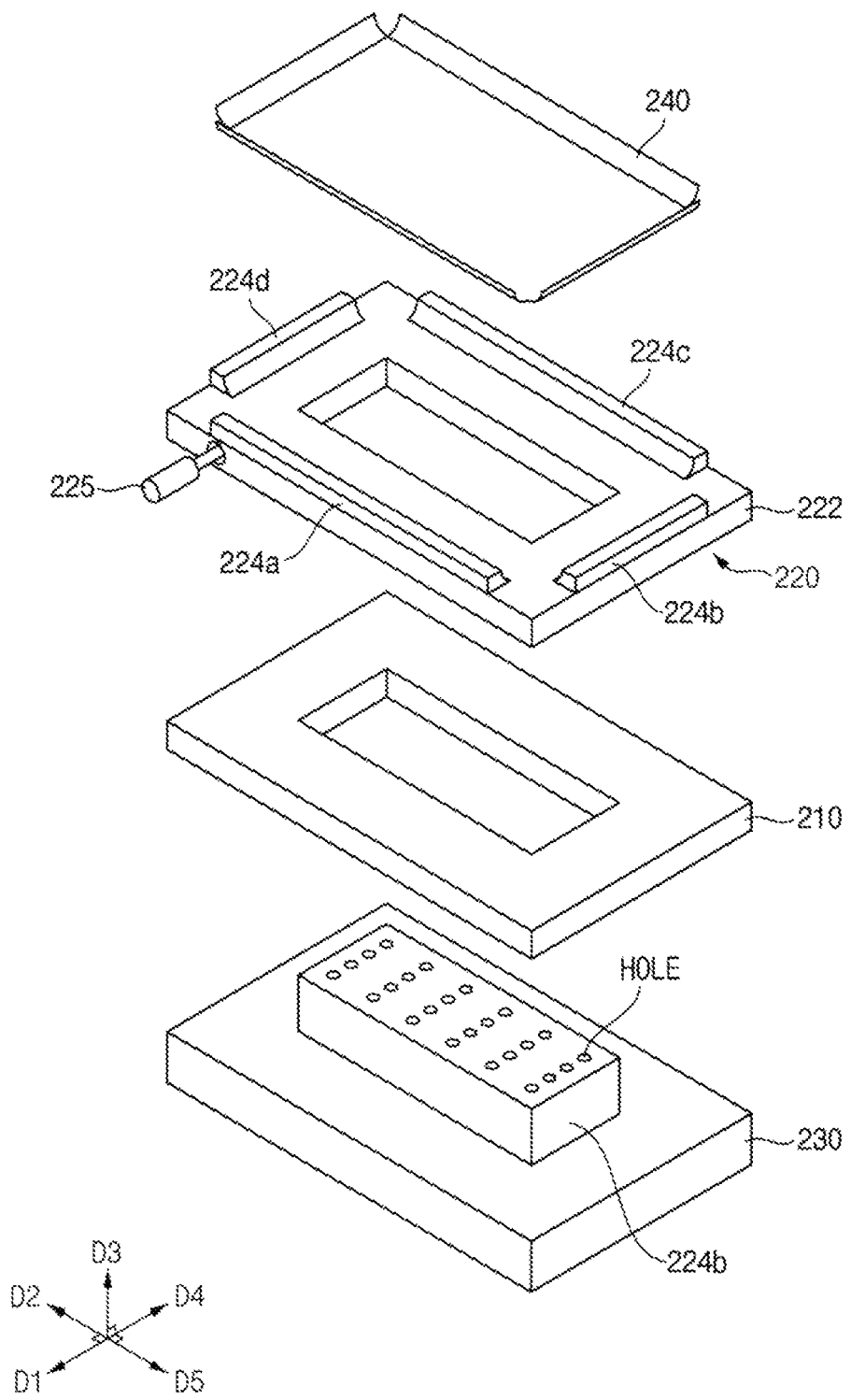
FIGS. 19A to 19D are perspective views showing a lamination apparatus according to one or more embodiments of the present invention.
Figure 19B:
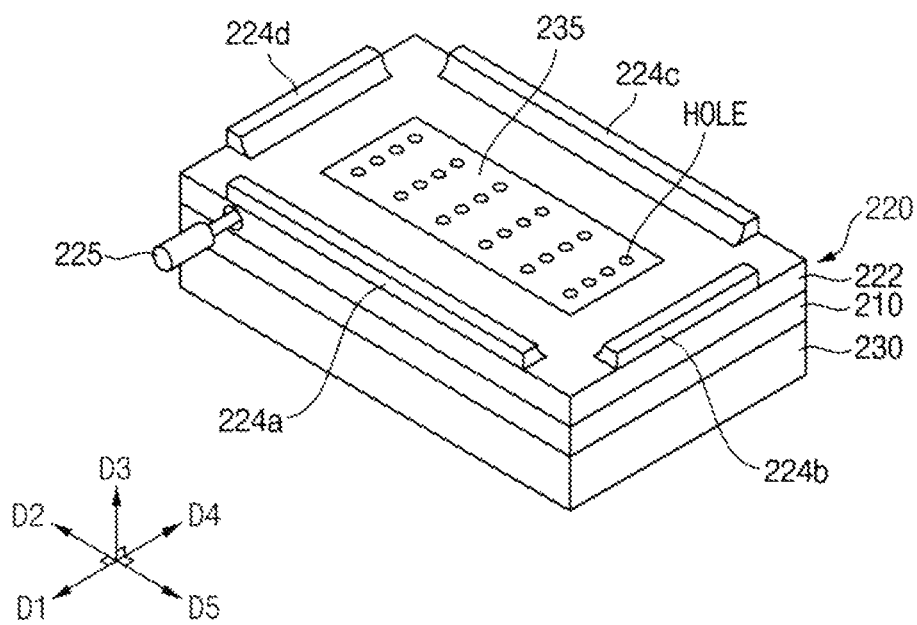
Figure 19C:
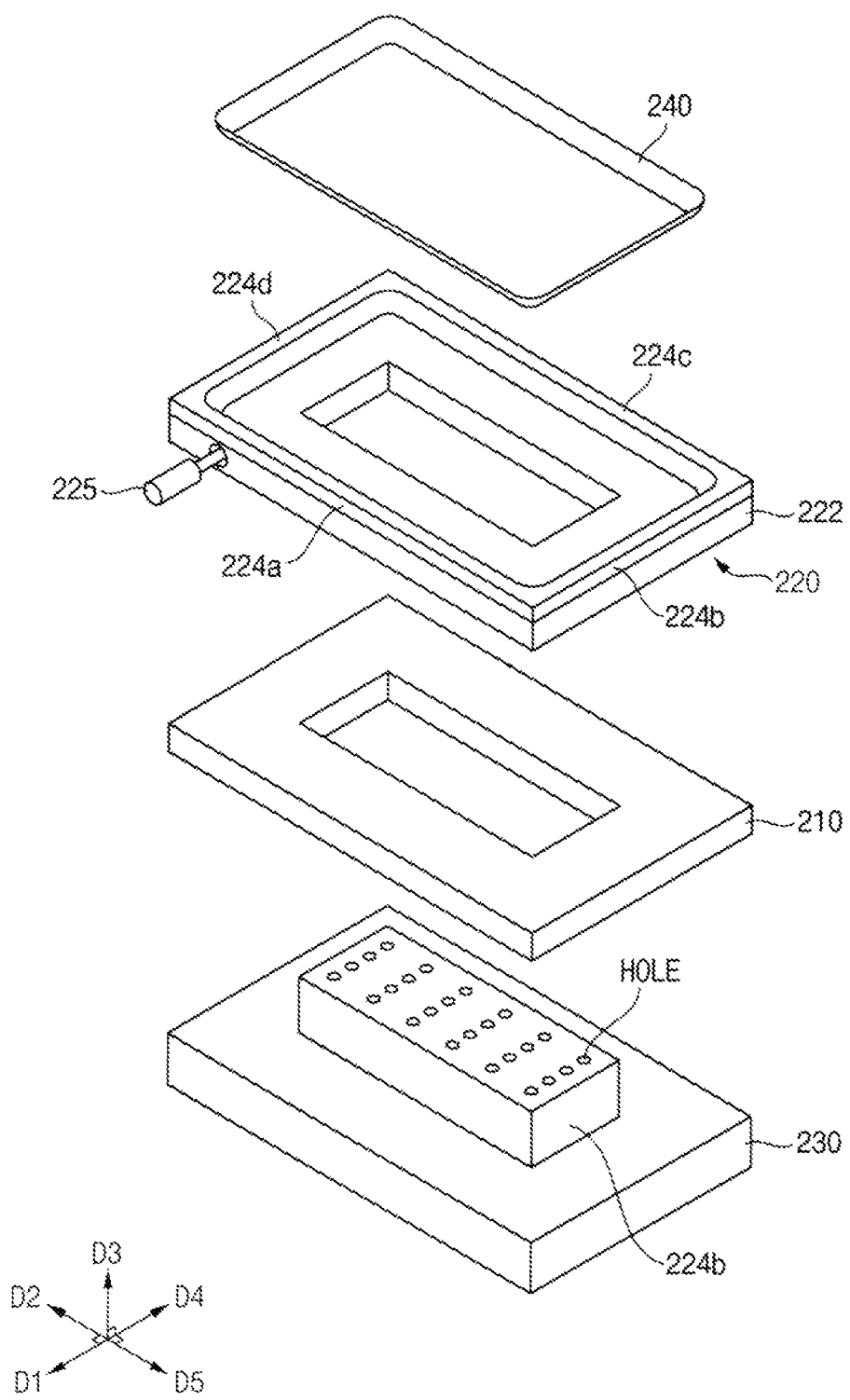
Figure 19D:
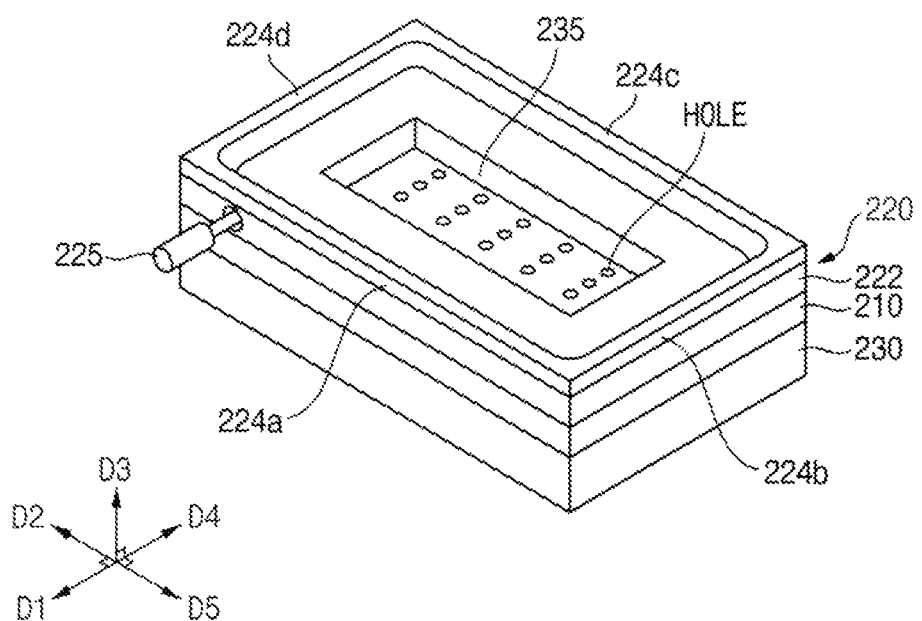
Figure 19E:
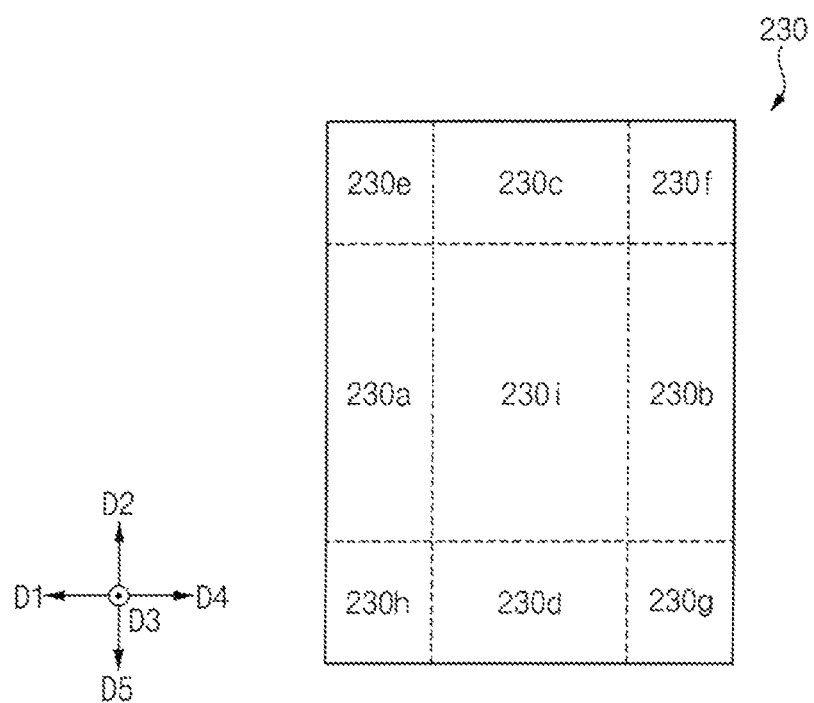
FIG. 19E is a view showing a top surface of a window jig fastening member of FIGS. 19A and 19C.

FIGS. 19A to 19D are perspective views showing the lamination apparatus according to one or more embodiments of the present invention; FIG. 19E is a view showing a top surface of the window jig fastening member of FIGS. 19A and 19C; and FIG. 19F is a perspective view showing embodiments of windows bonded by the lamination apparatus.

Referring to FIGS. 19A to 19F, in one or more embodiments, the lamination apparatus may include a first window jig fastening member 230, a first heat dissipation member 235, a second heat dissipation member 210, a first ceramic heater 220, and a first current supply member 225.

Referring to FIG. 19E, a top surface of the first window jig fastening member 230 may include a first sidewall area 230a, a second sidewall area 230b, a third sidewall area 230c, a fourth sidewall area 230d, a first corner area 230e, a second corner area 230f, a third corner area 230g, a fourth corner area 230h, and a central area 230i.

The first sidewall area 230a may be positioned in a first direction D1 of the central area 230i. The second sidewall area 230b may be positioned in a fourth direction D4 opposite to the first direction D1 of the central area 230i. The first sidewall area 230a may be spaced apart from the second sidewall area 230b by the central area 230i. The third sidewall area 230c may be positioned in a second direction D2 perpendicular to the first direction D1 of the central area 230i. The fourth sidewall area 230d may be positioned in a fifth direction D5 opposite to the second direction D2 of the central area 230i. The third sidewall area 230c may be spaced apart from the fourth sidewall area 230d by the central area 230i.

The first corner area 230*e* may be positioned adjacent to the first sidewall area 230*a* and the third sidewall area 230*c*. The second corner area 230*f* may be positioned adjacent to the second sidewall area 230*b* and the third sidewall area 230*c*. The third corner area 230*g* may be positioned adjacent to the second sidewall area 230*b* and the fourth sidewall area 230*d*. The fourth corner area 230*h* may be positioned adjacent to the first sidewall area 230*a* and the fourth sidewall area 230*d*.

In the embodiments, the first heat dissipation member 235 may be disposed on the central area 230*i*. For example, the first heat dissipation member 235 may be formed integrally with the first window jig fastening member 230. However, in one or more embodiments, the first heat dissipation member 235 may be formed separately from the first window jig fastening member 230.

The first heat dissipation member 235 may include an empty space therein. Air may be filled in the empty space. The first heat dissipation member 235 may include holes for filling the air in the empty space. Accordingly, the first heat dissipation member 235 may prevent or substantially prevent heat generated by the first ceramic heater 220 from being transferred to the first window jig fastening member 230.

In the embodiments, the second heat dissipation member 210 may be disposed on edges of the top surface of the first window jig fastening member 230. The second heat dissipation member 210 may be disposed while surrounding the first heat dissipation member 235. In one or more embodiments, the second heat dissipation member 210 may have a rectangular shape.

In one or more embodiments, the second heat dissipation member 210 may include a thermal insulation material. Accordingly, the second heat dissipation member 210 may prevent or substantially prevent heat generated by the first ceramic heater 220 from being transferred to the first window jig fastening member 230.

In one or more embodiments, the first window jig fastening member 230 may include a pressure sensor for sensing a pressure. The pressure sensor may be sensitive to heat. Accordingly, the first heat dissipation member 235 and the second heat dissipation member 210 may prevent or substantially prevent the heat by the first ceramic heater 220 from being transferred to the first window jig fastening member 230.

In the embodiments, the first ceramic heater 220 may be disposed on the second heat dissipation member 210 while overlapping the second heat dissipation member 210. For example, the first ceramic heater 220 may have a rectangular shape. The first ceramic heater 220 may include a ceramic material. When a current is supplied to the ceramic material, the ceramic material may provide a resistance and generate heat.

In the embodiments, the first current supply member 225 may be connected to the first ceramic heater 220. Although FIGS. 19A and 19B show that only one first current supply member 225 is connected to the first ceramic heater 220, this is merely an example and the present invention is not limited thereto. For example, first current supply members 225 may be connected to respective side surfaces of the first ceramic heater 220.

In one or more embodiments, the first ceramic heater 220 may include a flat portion 222 and first to fourth protrusion portions 224*a*, 224*b*, 224*c*, and 224*d* disposed on the flat portion 222. The first to fourth protrusion portions 224*a*, 224*b*, 224*c*, and 224*d* may be disposed at ends of the flat portion 222, respectively. In one or more embodiments, side surfaces of a four-sided bent window 240 may be provided with heat by the first to fourth protrusion portions 224*a*, 224*b*, 224*c*, and 224*d*. The heat generated from the first to fourth protrusion portions 224*a*, 224*b*, 224*c*, and 224*d* may prevent or substantially prevent air bubbles from being generated on each side surface of the four-sided bent window 240. In addition, when the heat is provided by the lamination apparatus, the window 240 may be effectively coupled to the display panel even at a low pressure. In one or more embodiments, as shown in FIGS. 19C and 19D, the first to fourth protrusion portions 224*a*, 224*b*, 224*c*, and 224*d* may be connected to each other in order to prevent or substantially prevent the air bubbles from being generated in each side surface of the four-sided bent window 240 when the four-sided bent window 240 is coupled to the display panel. In other words, the first to fourth protrusion portions 224*a*, 224*b*, 224*c*, and 224*d* may have a rectangular shape.

However, in one or more embodiments, the first ceramic heater 220 may include only two facing protrusion portions of the first to fourth protrusion portions 224*a*, 224*b*, 224*c*, and 224*d*. In this case, the lamination apparatus may be used when coupling a two-sided bent window and a display panel.

The window 140 may have a shape in which corner portions are not connected to each other as shown in FIG. 19F (i), or may have a shape in which the corner portions are connected to each other as shown in FIG. 19F (ii). The window 140 shown in FIG. 19F (i) may be bonded to the display panel by using the lamination apparatus shown in FIGS. 19A and 19B. The window 140 shown in FIG. 19F (ii) may be bonded to the display panel by using the lamination apparatus shown in FIGS. 19C and 19D.

In one or more embodiments, areas of the first to fourth protrusion portions 224*a*, 224*b*, 224*c*, and 224*d* in contact with the window 240 may have curved shapes. The curved area may have a curvature varying according to a curvature of each side surface of the window 240. In one or more embodiments, the areas of the first to fourth protrusion portions 224*a*, 224*b*, 224*c*, and 224*d* in contact with the window 240 may have right angular shapes.

Figure 20A:
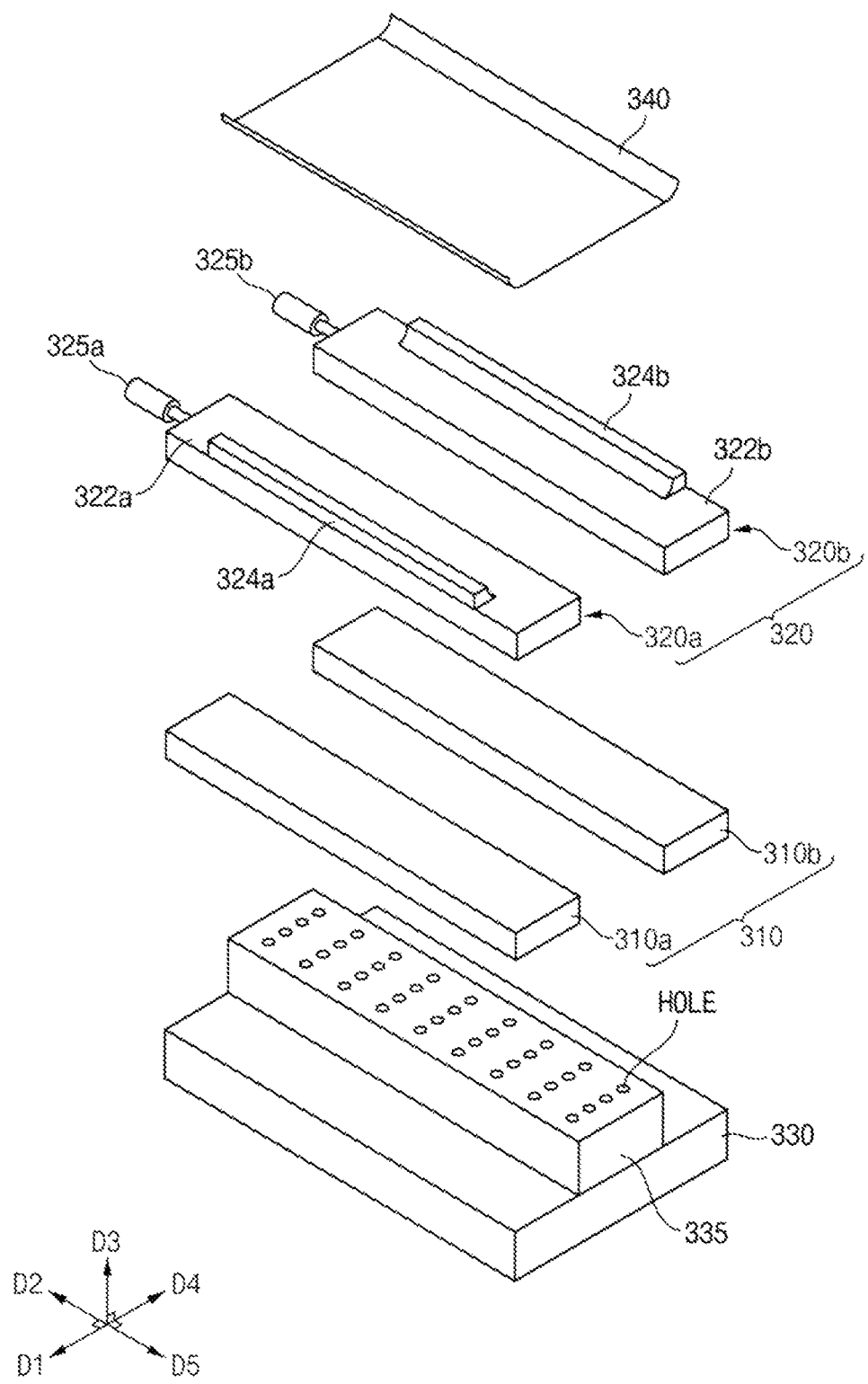
FIGS. 20A and 20B are perspective views showing a lamination apparatus according to one or more embodiments of the present invention.
Figure 20B:
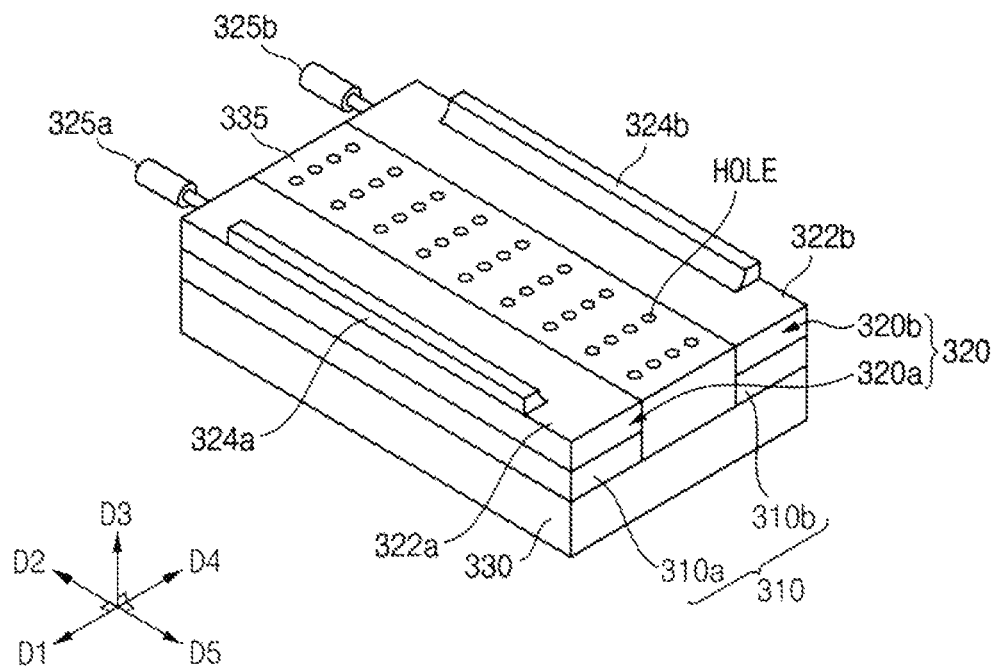
Figure 20C:
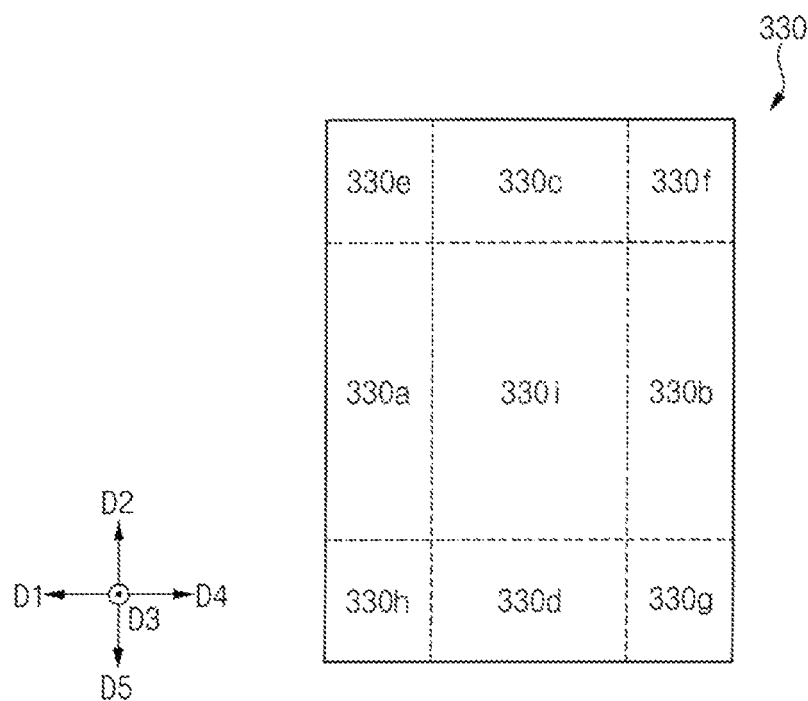
FIG. 20C is a view showing a top surface of a window jig fastening member of FIG. 20A.

FIGS. 20A and 20B are perspective views showing the lamination apparatus according to one or more embodiments of the present invention; and FIG. 20C is a view showing a top surface of a window jig fastening member of FIG. 20A.

Referring to FIGS. 20A, 20B, and 20C, the lamination apparatus may include a second window jig fastening member 330, a third heat dissipation member 335, a fourth heat dissipation member 310, a second ceramic heater 320, a second current supply member 325*a*, and a third current supply member 325*b*. The fourth heat dissipation member 310 may include a first sub-heat dissipation member 310*a* and a second sub-heat dissipation member 310*b*. The second ceramic heater 320 may include a first sub-ceramic heater 320*a* and a second sub-ceramic heater 320*b*.

A top surface of the second window jig fastening member 330 may include a first sidewall area 330*a*, a second sidewall area 330*b*, a third sidewall area 330*c*, a fourth sidewall area 330*d*, a first corner area 330*e*, a second corner area 330*f*, a third corner area 330*g*, a fourth corner area 330*h*, and a central area 330*i*.

The first sidewall area 330*a* may be positioned in the first direction D1 of the central area 330*i*. The second sidewall area 330*b* may be positioned in a fourth direction D4 opposite to the first direction D1 of the central area 330*i*. The first sidewall area 330*a* may be spaced apart from the second sidewall area 330*b* by the central area 330*i*. The third sidewall area 330*c* may be positioned in a second direction D2 perpendicular to the first direction D1 of the central area 330*i*. The fourth sidewall area 330*d* may be positioned in a fifth direction D5 opposite to the second direction D2 of the central area 330*i*. The third sidewall area 330*c* may be spaced apart from the fourth sidewall area 330*d* by the central area 330*i*.

The first corner area 330*e* may be positioned adjacent to the first sidewall area 330*a* and the third sidewall area 330*c*. The second corner area 330*f* may be positioned adjacent to the second sidewall area 330*b* and the third sidewall area 330*c*. The third corner area 330*g* may be positioned adjacent to the second sidewall area 330*b* and the fourth sidewall area 330*d*. The fourth corner area 330*h* may be positioned adjacent to the first sidewall area 330*a* and the fourth sidewall area 330*d*.

In the embodiments, the third heat dissipation member 335 may be disposed on the central area 330*i*. The first sub-heat dissipation member 310*a* may be disposed to overlap the first sidewall area 330*a*. The second sub-heat dissipation member 310*b* may be disposed to overlap the second sidewall area 330*b*. In other words, the first sub-heat dissipation member 310*a* and the second sub-heat dissipation member 310*b* may be disposed on both sides of the third heat dissipation member 335.

In the embodiments, the third heat dissipation member 335 may also be disposed in the third sidewall area 330*c* and the fourth sidewall area 330*d*. In this case, the first sub-heat dissipation member 310*a* may also be disposed in the first corner area 330*e* and the fourth corner area 330*h*. In addition, the second sub-heat dissipation member 310*b* may also be disposed in the second corner area 330*f* and the third corner area 330*g*.

In one or more embodiments, for example, the third heat dissipation member 335 may be formed integrally with the second window jig fastening member 330. However, the third heat dissipation member 335 may be formed separately from the second window jig fastening member 330.

The third heat dissipation member 335 may include an empty space therein. Air may be filled in the empty space. The third heat dissipation member 335 may include holes for filling the air in the empty space. Accordingly, the third heat dissipation member 335 may prevent or substantially prevent heat generated by the second ceramic heater 320 from being transferred to the second window jig fastening member 330.

In one or more embodiments, the fourth heat dissipation member 310 may contain a thermal insulation material. Accordingly, the fourth heat dissipation member 310 may prevent or substantially prevent heat generated by the second ceramic heater 320 from being transferred to the second window jig fastening member 330.

In one or more embodiments, the second window jig fastening member 330 may include a pressure sensor for sensing a pressure. The pressure sensor may be sensitive to heat. Accordingly, the third heat dissipation member 335 and the fourth heat dissipation member 310 may prevent or substantially prevent the heat by the second ceramic heater 320 from being transferred to the second window jig fastening member 330.

In the embodiments, the second ceramic heater 320 may include the first sub-ceramic heater 320*a* and the second sub-ceramic heater 320*b*. The first sub-ceramic heater 320*a* may be disposed on the first sub-heat dissipation member 310*a* to overlap the first sub-heat dissipation member 310*a*. The second sub-ceramic heater 320*b* may be disposed on the second sub-heat dissipation member 310*b* to overlap the second sub-heat dissipation member 310*b*. Each of the first sub-ceramic heater 320*a* and the second sub-ceramic heater 320*b* may include a ceramic material. The ceramic material may serve as a resistor. The second current supply member 325*a* may be connected to the first sub-ceramic heater 320*a*, and the third current supply member 325*b* may be connected to the second sub-ceramic heater 320*b*. Accordingly, the first sub-ceramic heater 320*a* and the second sub-ceramic heater 320*b* may transform a current into heat. Due to the first sub-ceramic heater 320*a* and the second sub-ceramic heater 320*b*, the heat may be applied to both side surfaces of a window 340 during a lamination process.

The first sub-ceramic heater 320*a* may include a flat portion 322*a* and a protrusion portion 324*a* disposed on the flat portion 322*a*. The second sub-ceramic heater 320*b* may include a flat portion 322*b* and a protrusion portion 324*b* disposed on the flat portion 322*b*. In one or more embodiments, areas of the two protrusion portions 324*a* and 324*b* in contact with the window 340 may have curved shapes.

Figure 21A:
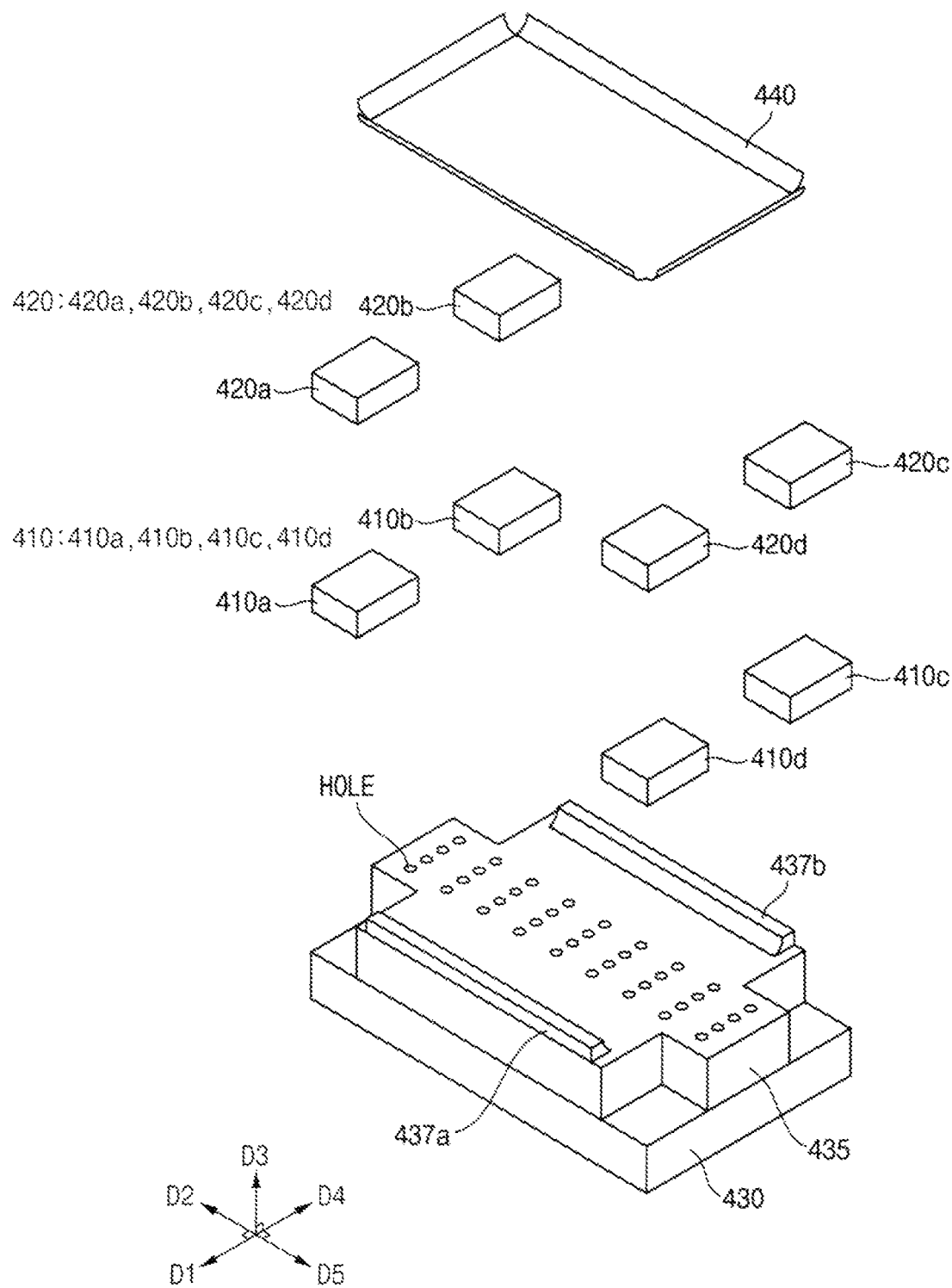
FIGS. 21A and 21B are perspective views showing a lamination apparatus according to one or more embodiments of the present invention.
Figure 21B:
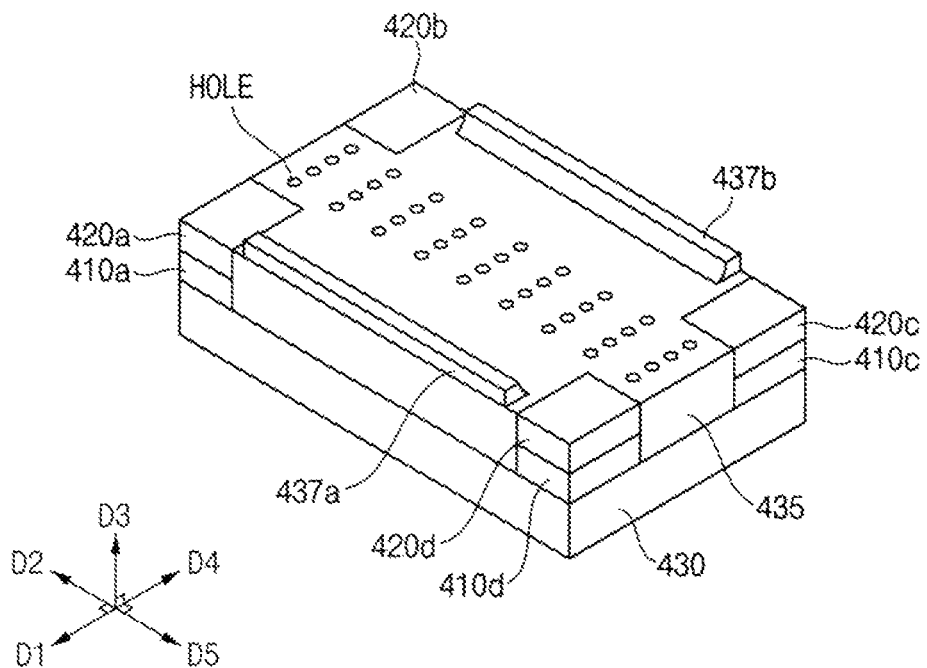
Figure 21C:
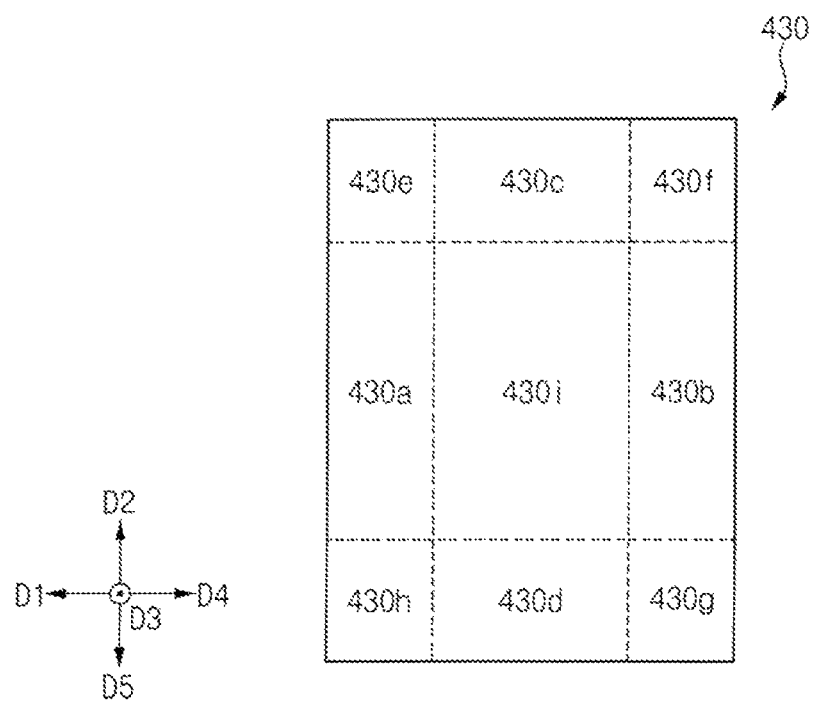
FIG. 21C is a view showing a top surface of a window jig fastening member of FIG. 21A.

FIGS. 21A and 21B are perspective views showing a lamination apparatus according to one or more embodiments of the present invention; and FIG. 21C is a view showing a top surface of a window jig fastening member of FIG. 21A.

Referring to FIGS. 21A, 21B, and 21C, the lamination apparatus may include a third window jig fastening member 430, a fifth heat dissipation member 435, a sixth heat dissipation member 410, and a third ceramic heater 420. The sixth heat dissipation member 410 may include a first sub-heat dissipation member 410*a*, a second sub-heat dissipation member 410*b*, a third sub-heat dissipation member 410*c*, and a fourth sub-heat dissipation member 410*d*. The third ceramic heater 420 may include a first sub-ceramic heater 420*a*, a second sub-ceramic heater 420*b*, a third sub-ceramic heater 420*c*, and a fourth sub-ceramic heater 420*d*. In one or more embodiments, each of the first sub-ceramic heater 420*a*, the second sub-ceramic heater 420*b*, the third sub-ceramic heater 420*c*, and the fourth sub-ceramic heater 420*d* may be connected to a current supply member.

A top surface of the third window jig fastening member 430 may include a first sidewall area 430*a*, a second sidewall area 430*b*, a third sidewall area 430*c*, a fourth sidewall area 430*d*, a first corner area 430*e*, a second corner area 430*f*, a third corner area 430*g*, a fourth corner area 430*h*, and a central area 430*i*.

The first sidewall area 430*a* may be positioned in a first direction D1 of the central area 430*i*. The second sidewall area 430*b* may be positioned in a fourth direction D4 opposite to the first direction D1 of the central area 430*i*. The first sidewall area 430*a* may be spaced apart from the second sidewall area 430*b* by the central area 430*i*. The third sidewall area 430*c* may be positioned in a second direction D2 perpendicular to the first direction D1 of the central area 430*i*. The fourth sidewall area 430*d* may be located in a fifth direction D5 opposite to the second direction D2 of the central area 430*i*. The third sidewall area 430*c* may be spaced apart from the fourth sidewall area 430*d* by the central area 430*i*.

The first corner area 430*e* may be positioned adjacent to the first sidewall area 430*a* and the third sidewall area 430*c*. The second corner area 430*f* may be positioned adjacent to the second sidewall area 430*b* and the third sidewall area 430*c*. The third corner area 430*g* may be positioned adjacent to the second sidewall area 430*b* and the fourth sidewall area 430*d*. The fourth corner area 430*h* may be positioned adjacent to the first sidewall area 430*a* and the fourth sidewall area 430*d*.

In the embodiments, the fifth heat dissipation member 435 may be disposed to overlap the central area 430*i*, the first sidewall area 430a, the second sidewall area 430b, the third sidewall area 430c, and the fourth sidewall area 430d. In one or more embodiments, for example, the fifth heat dissipation member 435 may be formed integrally with the third window jig fastening member 430. However, the fifth heat dissipation member 435 may be formed separately from the third window jig fastening member 430.

In one or more embodiments, the fifth heat dissipation member 435 may include protrusions 437a and 437b on portions overlapping the first sidewall area 430a and the second sidewall area 430b. The protrusion portions 437a and 437b may protrude in a third direction D3 perpendicular to the first direction D1 and the second direction D2. However, this is merely an example, and protrusion portions may also be formed on portions of the fifth heat dissipating member 435 overlapping the third sidewall area 430c and the fourth sidewall area 430d.

The fifth heat dissipation member 435 may include an empty space therein. Air may be filled in the empty space. The fifth heat dissipation member 435 may include holes for filling the air in the empty space. Accordingly, the fifth heat dissipation member 435 may prevent or substantially prevent heat generated by the third ceramic heater 420 from being transferred to the third window jig fastening member 430.

The first sub-heat dissipation member 410a may be disposed to overlap the first corner area 430e. The second sub-heat dissipation member 410b may be disposed to overlap the second corner area 430f. The third sub-heat dissipation member 410c may be disposed to overlap the third corner area 430g. The fourth sub-heat dissipation member 410d may be disposed to overlap the fourth corner area 430h.

In one or more embodiments, the third window jig fastening member 430 may include a pressure sensor for sensing a pressure. The pressure sensor may be sensitive to heat. Accordingly, the fifth heat dissipation member 435 and the sixth heat dissipation member 410 may prevent or substantially prevent the heat by the third ceramic heater 420 from being transferred to the third window jig fastening member 430.

The first sub-ceramic heater 420a may be disposed on the first sub-heat dissipation member 410a to overlap the first sub-heat dissipation member 410a. The second sub-ceramic heater 420b may be disposed on the second sub-heat dissipation member 410b to overlap the second sub-heat dissipation member 410b. The third sub-ceramic heater 420c may be disposed on the third sub-heat dissipation member 410c to overlap the third sub-heat dissipation member 410c. The fourth sub-ceramic heater 420d may be disposed on the fourth sub-heat dissipation member 410d to overlap the fourth sub-heat dissipation member 410d.

Accordingly, when the lamination process is in progress, the lamination apparatus may apply heat to each corner area of a window 440. Accordingly, when the window 440 is coupled to a display panel, air bubbles generated in each corner area of the window 440 and the display panel may be prevented or substantially prevented. In addition, the lamination apparatus may apply heat to each corner area to which a relatively smaller pressure is applied, such that the corner areas may be effectively coupled.

Although some embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A lamination apparatus comprising:
    a window jig to support a window; and
    a heating member in the window jig to partially heat the window jig, wherein
    the window jig comprises:
    a flat portion comprising a first sidewall area, a second sidewall area facing the first sidewall area in a first direction, a third sidewall area perpendicular to the first sidewall area, and a fourth sidewall area perpendicular to the first sidewall area and facing the third sidewall area in a second direction perpendicular to the first direction;
    a first protrusion portion protruding in a third direction perpendicular to the first and second directions on the first sidewall area; and
    a second protrusion portion protruding in the third direction on the second sidewall area.

2. The lamination apparatus of claim 1, wherein the heating member comprises a cartridge heater comprising an electrical resistance member.

3. The lamination apparatus of claim 2, wherein the cartridge heater is arranged in the flat portion.

4. The lamination apparatus of claim 3, wherein the electrical resistance member overlaps each of the first sidewall area and the second sidewall area.

5. The lamination apparatus of claim 3, wherein the electrical resistance member overlaps each of the first sidewall area, the second sidewall area, the third sidewall area, and the fourth sidewall area.

6. The lamination apparatus of claim 3, wherein the electrical resistance member overlaps each of a first corner area adjacent to the first sidewall area and the third sidewall area, a second corner area adjacent to the second sidewall area and the third sidewall area, a third corner area adjacent to the second sidewall area and the fourth sidewall area, and a fourth corner area adjacent to the first sidewall area and the fourth sidewall area.

7. The lamination apparatus of claim 2, wherein the cartridge heater is arranged in each of the first sidewall area and the second sidewall area.

8. The lamination apparatus of claim 2, wherein the cartridge heater is arranged in each of the first sidewall area, the second sidewall area, the third sidewall area, and the fourth sidewall area.

9. The lamination apparatus of claim 2, wherein the cartridge heater is arranged in each of a first corner area adjacent to the first sidewall area and the third sidewall area, a second corner area adjacent to the second sidewall area and the third sidewall area, a third corner area adjacent to the second sidewall area and the fourth sidewall area, and a fourth corner area adjacent to the first sidewall area and the fourth sidewall area.

10. The lamination apparatus of claim 1, further comprising:
    a chamber in which the window jig is located;
    a pressing member disposed in the chamber; and
    a window jig fastening member between the chamber and the window jig, comprising a pressure sensor to sense a pressure applied by the pressing member.

11. The lamination apparatus of claim 10, further comprising:
    a heat dissipation member between the window jig and the window jig fastening member.

12. A lamination apparatus comprising:
- a window jig to support a window, and comprising a flat portion comprising a first sidewall area, a second sidewall area facing the first sidewall area in a first direction, a third sidewall area perpendicular to the first sidewall area, and a fourth sidewall area perpendicular to the first sidewall area and facing the third sidewall area in a second direction perpendicular to the first direction, a first protrusion portion protruding in a third direction perpendicular to the first and second directions on the first sidewall area, and a second protrusion portion protruding in the third direction on the second sidewall area; and
- a heating member located in a first corner area adjacent to the first sidewall area and the third sidewall area of the flat portion, a second corner area adjacent to the second sidewall area and the third sidewall area, a third corner area adjacent to the second sidewall area and the fourth sidewall area, and a fourth corner area adjacent to the first sidewall area and the fourth sidewall area.

13. The lamination apparatus of claim 12, wherein the heating member is further located in a center of the flat portion.

14. The lamination apparatus of claim 12, wherein the heating member comprises an infrared lamp to emit light.

15. The lamination apparatus of claim 12, further comprising:
- a chamber in which the window jig is located;
- a pressing member disposed in the chamber; and
- a window jig fastening member between the chamber and the window jig, comprising a pressure sensor to sense a pressure applied by the pressing member.

16. The lamination apparatus of claim 15, further comprising:
- a heat dissipation member between the window jig and the window jig fastening member.

17. A lamination apparatus comprising:
- a window jig fastening member comprising a top surface comprising a central area, a first sidewall area positioned in a first direction of the central area, a second sidewall area spaced apart from the first sidewall area by the central area, a third sidewall area positioned in a second direction perpendicular to the first direction of the central area, a fourth sidewall area spaced apart from the third sidewall area by the central area, a first corner area adjacent to the first sidewall area and the third sidewall area, a second corner area adjacent to the second sidewall area and the third sidewall area, a third corner area adjacent to the second sidewall area and the fourth sidewall area, and a fourth corner area adjacent to the first sidewall area and the fourth sidewall area;
- a first heat dissipation member arranged on the central area of the window jig fastening member, and comprising an empty space therein;
- a second heat dissipation member arranged in a periphery of the first heat dissipation member on the window jig fastening member, and comprising a thermal insulation material;
- a ceramic heater arranged on the second heat dissipation member to overlap the second heat dissipation member; and
- a current supply member connected to the ceramic heater.

18. The lamination apparatus of claim 17, wherein the second heat dissipation member has a rectangular shape surrounding the first heat dissipation member, and the ceramic heater has a rectangular shape surrounding the first heat dissipation member.

19. The lamination apparatus of claim 18, wherein the ceramic heater comprises a protrusion portion protruding in a third direction perpendicular to the first direction and the second direction at a portion overlapping the first sidewall area and the second sidewall area.

20. The lamination apparatus of claim 18, wherein the ceramic heater comprises a protrusion portion protruding in a third direction perpendicular to the first direction and the second direction at a portion overlapping the first to fourth sidewall areas.

21. The lamination apparatus of claim 18, wherein the ceramic heater comprises a protrusion portion protruding in a third direction perpendicular to the first direction and the second direction as a whole.

22. The lamination apparatus of claim 17, wherein the second heat dissipation member comprises a first sub-heat dissipation member overlapping the first sidewall area; and a second sub-heat dissipation member overlapping the second sidewall area, and
- the ceramic heater comprises a first sub-ceramic heater overlapping the first sidewall area; and a second sub-ceramic heater overlapping the second sidewall area.

23. The lamination apparatus of claim 22, wherein each of the first sub-ceramic heater and the second sub-ceramic heater comprises a protrusion portion protruding in a third direction perpendicular to the first direction and the second direction.

24. The lamination apparatus of claim 17, wherein the first heat dissipation member overlaps the first to fourth sidewall areas, the second heat dissipation member comprises first to fourth sub-heat dissipation members overlapping the first to fourth corner areas, respectively, and the ceramic heater comprises first to fourth sub-ceramic heaters overlapping the first to fourth corner areas, respectively.

25. The lamination apparatus of claim 24, wherein the first heat dissipation member comprises a protrusion portion protruding in a third direction perpendicular to the first and second directions at a portion overlapping the first to fourth sidewall areas.

26. The lamination apparatus of claim 24, wherein the first heat dissipation member comprises a protrusion portion protruding in a third direction perpendicular to the first and second directions at a portion overlapping the first and second sidewall areas.

* * * * *